US009843826B2

(12) United States Patent
Okada et al.

(10) Patent No.: US 9,843,826 B2
(45) Date of Patent: Dec. 12, 2017

(54) DATA PROCESSOR AND DATA PROCESSING METHOD

(71) Applicant: SONY CORPORATION, Tokyo (JP)

(72) Inventors: Satoshi Okada, Tokyo (JP); Takashi Yokokawa, Kanagawa (JP); Naoki Yoshimochi, Kanagawa (JP); Makiko Yamamoto, Tokyo (JP)

(73) Assignee: SONY CORPORATION, Tokyo (JP)

( * ) Notice: Subject to any disclaimer, the term of this patent is extended or adjusted under 35 U.S.C. 154(b) by 0 days.

(21) Appl. No.: 15/021,813

(22) PCT Filed: Nov. 19, 2014

(86) PCT No.: PCT/JP2014/080576
§ 371 (c)(1),
(2) Date: Mar. 14, 2016

(87) PCT Pub. No.: WO2015/083540
PCT Pub. Date: Jun. 11, 2015

(65) Prior Publication Data
US 2016/0234531 A1 Aug. 11, 2016

(30) Foreign Application Priority Data
Dec. 3, 2013 (JP) .................................. 2013-249744

(51) Int. Cl.
H04N 7/16 (2011.01)
H04N 21/236 (2011.01)
(Continued)

(52) U.S. Cl.
CPC .......... H04N 21/236 (2013.01); H04H 20/33 (2013.01); H04H 20/42 (2013.01);
(Continued)

(58) Field of Classification Search
CPC ............ H04N 21/236; H04N 21/6143; H04N 21/845
See application file for complete search history.

(56) References Cited

U.S. PATENT DOCUMENTS

2007/0189315 A1* 8/2007 Aoyanagi ........ H04N 21/23406
370/412
2012/0307842 A1* 12/2012 Petrov .............. H04N 21/23608
370/474

FOREIGN PATENT DOCUMENTS

EP 2 639 991 A2 9/2013
JP 2013-520035 A 5/2013
(Continued)

OTHER PUBLICATIONS

"Digital Video Broadcasting (DVB); Second generation framing structure, channel coding and modulation systems for Broadcasting, Interactive Services; News Gathering and other broadband satellite applications (DVB-S2), ETSI EN 302 307 V1.2.1, " European Telecommunications Standards Institute, 2009, 78 pages.
(Continued)

Primary Examiner — Gigi L Dubasky
(74) Attorney, Agent, or Firm — Oblon, McClelland, Maier & Neustadt, L.L.P.

(57) ABSTRACT

The present invention relates to a data processor and data processing method that facilitate properly processing a stream. An input stream is formed by a plurality of packets. Each of the packets of the input stream is distributed to one of a plurality of channels and null packets (NP) are distributed to the other channels. This divides the input stream into divided streams on a plurality of channels including the packets of the input stream at a predetermined density. The present invention can be used, for example, for a channel
(Continued)

bonding (CB) technique in which an input stream is divided into a plurality of channels and transmitted.

6 Claims, 20 Drawing Sheets

(51) Int. Cl.
| | |
|---|---|
| *H04H 20/33* | (2008.01) |
| *H04H 20/42* | (2008.01) |
| *H04N 21/845* | (2011.01) |
| *H04N 21/2385* | (2011.01) |
| *H04N 21/2389* | (2011.01) |
| *H04N 21/242* | (2011.01) |
| *H04N 21/43* | (2011.01) |
| *H04N 21/4385* | (2011.01) |
| *H04N 21/462* | (2011.01) |

(52) U.S. Cl.
CPC ..... *H04N 21/2385* (2013.01); *H04N 21/2389* (2013.01); *H04N 21/23611* (2013.01); *H04N 21/242* (2013.01); *H04N 21/4307* (2013.01); *H04N 21/4385* (2013.01); *H04N 21/4622* (2013.01); *H04N 21/845* (2013.01)

(56) References Cited

FOREIGN PATENT DOCUMENTS

| | | |
|---|---|---|
| WO | WO 2015/011626 A1 | 1/2015 |
| WO | WO 2015/033265 A1 | 3/2015 |

OTHER PUBLICATIONS

International Search Report dated Feb. 24, 2015 in PCT/JP14/80576 Filed Nov. 19, 2014.
Office Action issued in European Application No. 14868130.7 dated May 2, 2017.
Digital Video Broadcasting (DVB); Second generation framing structure, channel coding and modulation systems for Broadcasting, Interactive Services, News Gathering and other broadband satellite applications; Part II: S2-Extensions (DVB-S2X)—(Optional), DVB Document A83-2, Mar. 1, 2014 (Mar. 1, 2014), pp. 1-114, XP055290304.
DVB Organization: "TM4941_Draft_S2-X_Specification.pdf", DVB, Digital Video Broadcasting, C/O EBU—17A Ancienne Route—CH-1218 Grand Saconnex, Geneva—Switzerland, Oct. 21, 2013 (Oct. 21, 2013), XP017842249.
DVB Organization: "TM-S20281_Annex-M-Comments.docz", DVB, Digital Video Broadcasting, C/O EBU—17A Ancienne Route—CH-1218 Grand Saconnex, Geneva—Switzerland, Oct. 7, 2013 ( Oct. 7, 2013), XP017845061.

* cited by examiner

FIG. 17

ISSY field coding (2 or 3 bytes)

| First Byte | | | | Second Byte | Third Byte | |
|---|---|---|---|---|---|---|
| bit-7(MSB) | bit-6 | bit-5 and bit-4 | bit-3 and bit-2 | bit-1 and bit-0 | bit-7 to bit-0 | bit-7 bit-0 |
| 0=$ISCR_{short}$ | MSB of $ISCR_{short}$ | next 6 bits of $ISCR_{short}$ | | | next 8 bits of $SCR_{short}$ | not present | ISCR TIME (INFORMATION) |
| 1 | 0=$ISCR_{long}$ | 6 MSBs of $ISCR_{long}$ | | | next 8 bits of $ISCR_{long}$ | next 8 bits of $ISCR_{long}$ |
| 1 | 1 | 00=BUFS | BUFS unit 00=bits 01=Kbits 10=Mbits 11=reserved | 2 MSBs of BUFS | next 8 bits of BUFS | not present when $ISCR_{short}$ is used; else reserved | BUFS (REQUIRED Buffer AMOUNT) |
| 1 | 1 | 10=BUFSTAT | BUFSTAT unit 00=bits 01=Kbits 10=Mbits 11=reserved | 2 MSBs of BUFSTAT | next 8 bits of BUFSTAT | not present when $ISCR_{short}$ is used; else reserved | BUFSTAT (READING START TIME) |

FIG. 18

BBHeader (Mode Adaptation characteristics) and
Slicing Policy for Single Transport Stream Broadcast services

| BB Header | | | | | | | |
|---|---|---|---|---|---|---|---|
| Application area/configuration | MATYPE-1 | MATYPE-2 | UPL | DFL | SYNC | SYNCD | CRC-8 | Slicing policy |
| Broadcasting services/ CCM, single TS | 11-1-1-0-0-Y | XXXXXXXX | 188$_D$x8 | K$_{bch}$-80$_D$ | 47$_{HEX}$ | Y | Y | Break No timeout No Padding No Dummy frame |

X=not defined; Y=according to configuration/computation.
Break=break packets in subsequent DATAFIELDs; Timeout:maximum delay in merger/slicer buffer.

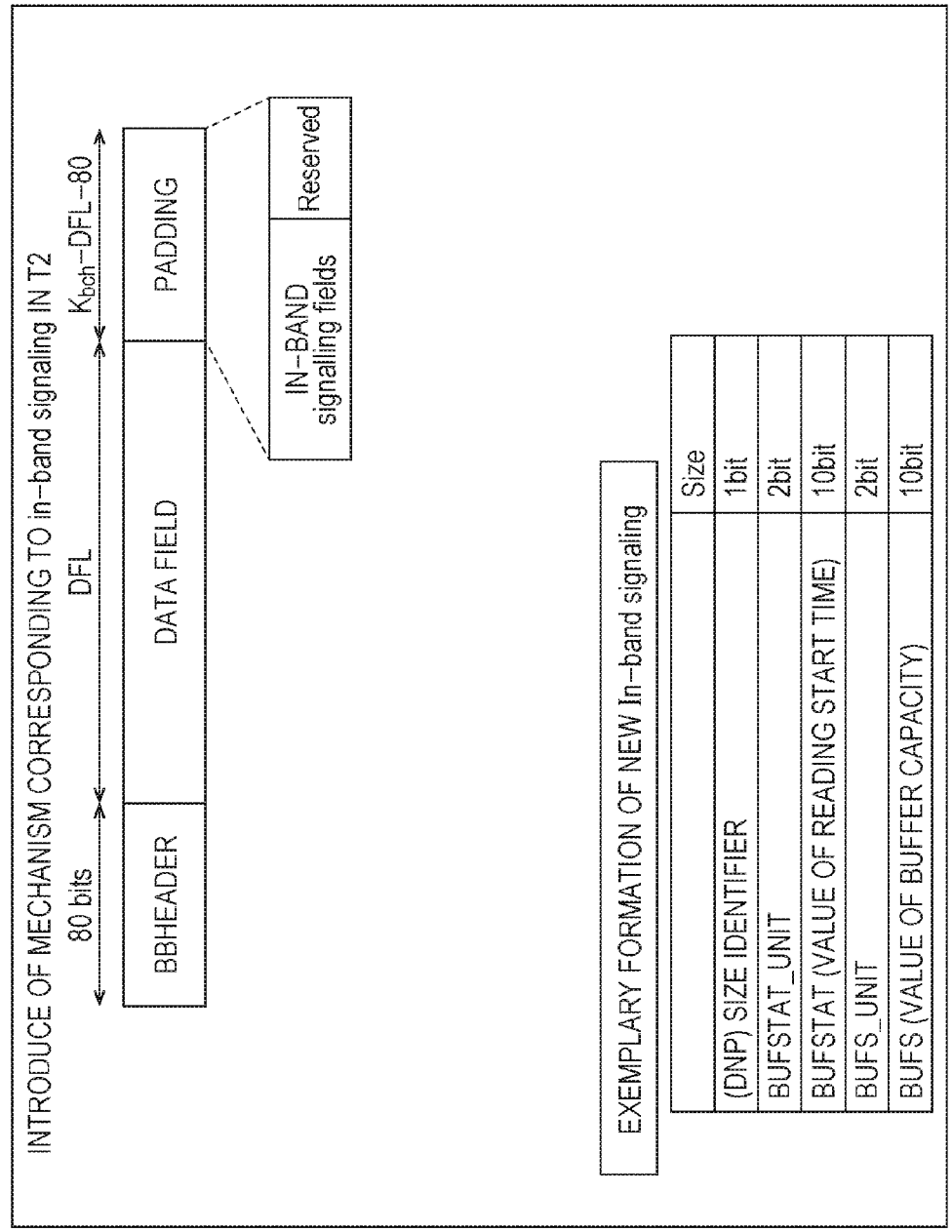

DATA PROCESSOR AND DATA PROCESSING METHOD

TECHNICAL FIELD

The present invention relates to a data processor and a data processing method, and in particular to a data processor and a data processing method, for example, that facilitate properly processing a stream.

BACKGROUND ART

For example, digital video broadcasting (DVB)-S2 used in Europe is cited as an example of a digital broadcast standard (Non-patent Document 1)

CITATION LIST

Non-Patent Document

Non-patent Document 1: DVB-S.2 ETSI EN 302 307 V1.2.1 (2009-08)

SUMMARY OF THE INVENTION

Problems to be Solved by the Invention

A technique to transmit a stream at a high data rate in digital broadcasting is a channel bonding (CB) technique in which a stream at a high data rate is divided into streams on a plurality of channels to transmit on the transmitting end and the streams on the channels are reconstructed as the original high-data-rate stream on the receiving end.

The development of a standard called DVB-S2x (or DVB-S.2 evo) as an improved DVB-S2 is in progress. It is discussed to use the CB technique in the DVB-S2x.

However, the details of the CB technique have not been determined so far. This may cause failure to properly process a stream when the CB technique is used in digital broadcasting such as DVB-S2x.

In light of the foregoing, the present invention facilitates properly processing a stream.

Solutions to Problems

A first data processor of the present invention includes a division unit that divides an input stream formed by a plurality of packets into divided streams on a plurality of channels including the packets of the input stream at a predetermined density by distributing each of the packets of the input stream to a channel of the channels and distributing null packets (NP) to all of channels other than the channel.

A first data processing method of the present invention includes: dividing an input stream formed by a plurality of packets into divided streams on a plurality of channels including the packets of the input stream at a predetermined density by distributing each of the packets of the input stream to a channel of the channels and distributing null packets (NP) to all of channels other than the channel.

In the first data processor and the first data processing method described above, each of the packets of the input stream is distributed to one of a plurality of channels and null packets (NP) are distributed to the other channels. This divides the input stream into divided streams on a plurality of channels including the packets of the input stream at a predetermined density.

A second data processor of the present invention includes: a division unit that divides an input stream formed by a plurality of packets into divided streams on a plurality of channels including the packets of the input stream at a predetermined den by distributing each of the packets of the input stream to a channel of the channels and distributing null packets (NP) to all of channels other than the channel; and a processing unit that processes a stream transmitted from a transmission device.

A second data processing method of the present invention includes: processing a stream transmitted from a transmission device, the transmission device including a division unit that divides an input stream formed by a plurality of packets into divided streams on a plurality of channels including the packets of the input stream at a predetermined density by distributing each of the packets of the input stream to a channel of the channels and distributing null packets (NP) to all of channels other than the channel.

The second data processor and data processing method described above process the stream transmitted from a transmission device. The transmission device includes a division unit that divides an input stream formed by a plurality of packets into a plurality of divided streams including the packets of the input stream at a predetermined density by distributing each of the packets of the input stream to one of a plurality of channels and distributing null packets (NP) to other channels.

Note that the data processor can be an independent device or can be an internal block included in a device.

Effects of the Invention

According to the present invention, a stream can properly be processed.

Note that the present invention is not necessarily limited to the effects described herein, and can be any one of the effects described herein.

BRIEF DESCRIPTION OF DRAWINGS

FIG. 17 is a diagram of the format of ISSY.

FIG. 18 is a diagram of the format of a BB header.

FIG. 19 is an explanatory diagram of a method for transmitting the size identifier, BUFS, and BUFSTAT.

MODE FOR CARRYING OUT THE INVENTION

An Embodiment of a Transmission System Using the Present Invention

Figure 1:
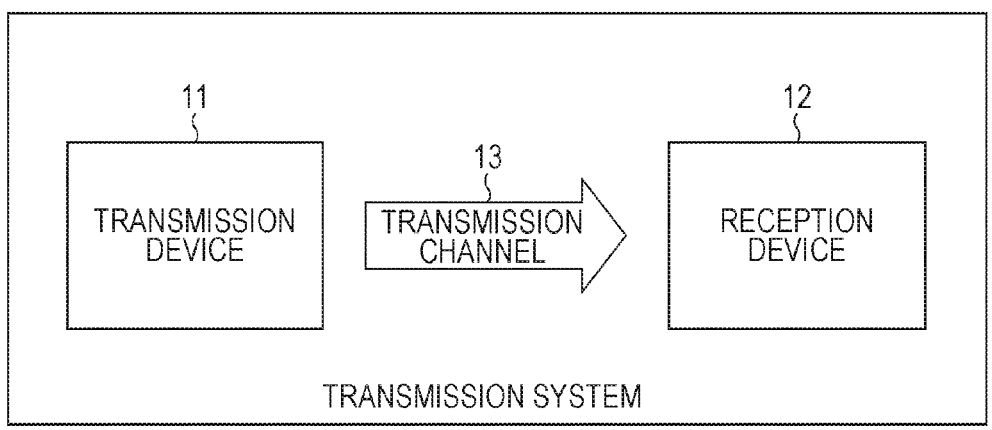
FIG. 1 is a block diagram of an exemplary configuration according to an embodiment of a transmission system using the present invention.

FIG. 1 is a block diagram of an embodiment of a transmission system using the present invention (the system is a logical collection of a plurality of devices, and it does not matter if the devices are housed in a housing).

As illustrated in FIG. 1, the transmission system includes a transmission device 11 and a reception device 12.

The transmission device 11 performs transmission (digital broadcast) (data transmission), for example, of a television broadcasting program. In other words, the transmission device 11 transmits a stream of data to be transmitted, for example, image data and audio data of a program by dividing the stream into streams on a plurality of channels and transmitting the streams via a transmission channel 13 such as a satellite, terrestrial, or cable (wired) broadcast by the CB technique.

The reception device 12 receives the streams on the channels transmitted from the transmission device 11 via the transmission channel 13, and reconstructs and outputs the original stream.

An Exemplary Configuration of the Transmission Device 11

Figure 2:
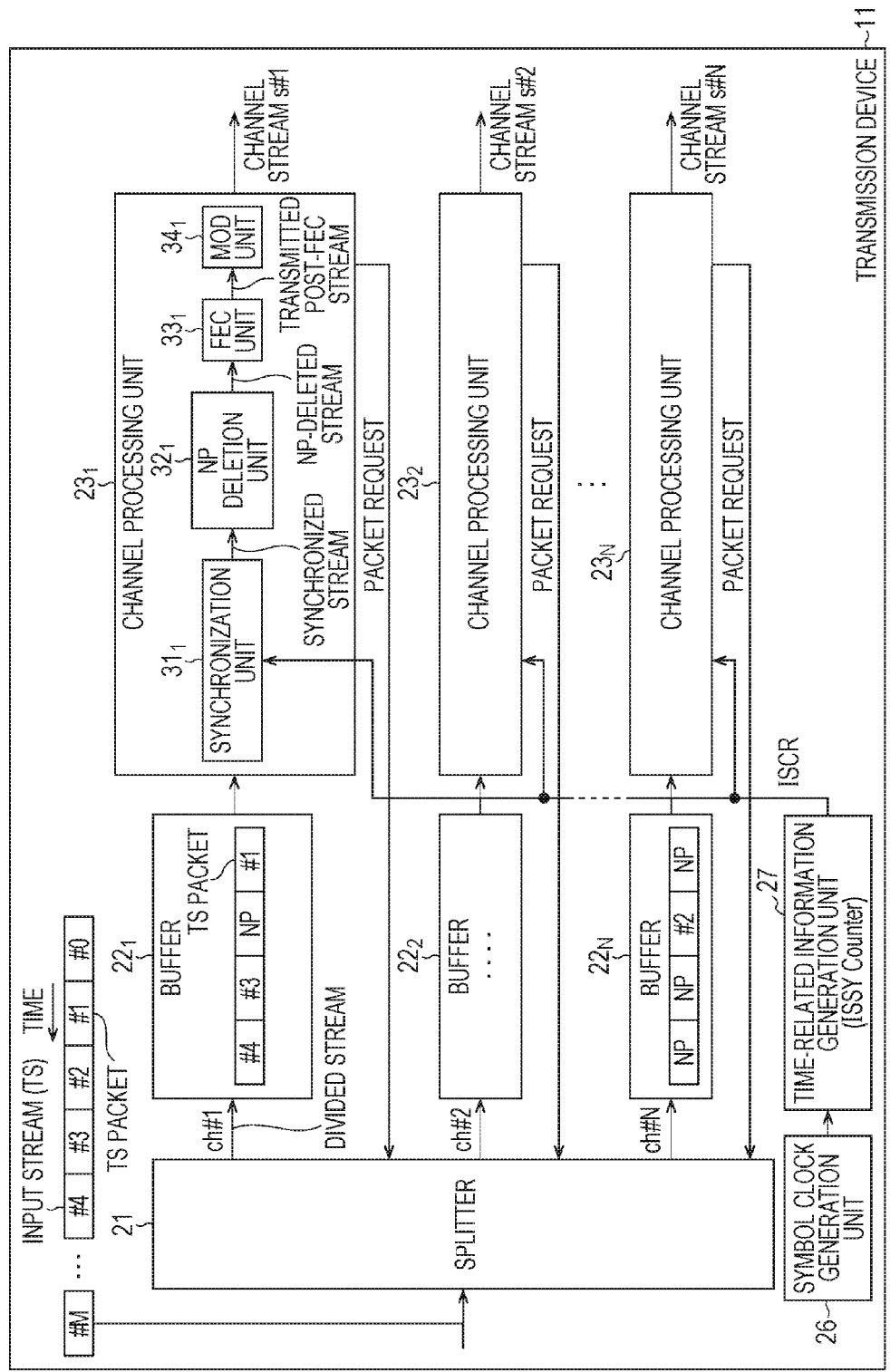
FIG. 2 is a block diagram of an exemplary configuration of a transmission device 11.

FIG. 2 is a block diagram of an exemplary configuration of the transmission device 11 illustrated in FIG. 1.

As illustrated in FIG. 2, the transmission device 11 includes a splitter 21, N buffers $22_1$ to $22_N$, N channel processing units $23_1$ to $23_N$, a symbol clock generation unit 26, and a time-related information generation unit 27.

A stream to be transmitted, for example, transport stream (TS) at a high data rate, for example, of 100 Mega bit per second (Mbps) is provided as an input stream to the transmission device 11. The TS includes, for example, a plurality of TS packets . . . , #0, #1, . . . . The transmission device 11 divides the input stream into the divided streams on N (or less) channels as a plurality of channels and transmits the streams by the CB technique.

The input stream is provided in the splitter 21. The splitter 21 receives the provided input stream, and divides the stream into the divided streams on N (or less) channels ch#1 to ch#N.

In other words, the splitter 21 repeats distributing each TS packet of the input stream to one of N channels ch#1 to ch#N and null packets (NP) to all of the other channels. This divides the input stream into the divided streams on N channels ch#1 to ch#N.

The splitter 21 provides (the packets) of the divided stream on the channel ch#n (the nth channel) to the buffer $22_n$ in response to a request from the channel processing unit $23_n$ (a packet request).

The buffer $22_n$, for example, in first in first out (FIFO) sequentially stores (the packets) of the divided stream on the channel ch#n provided from the splitter 21 and sequentially provides the stored divided stream on the channel ch#n to the channel processing unit $23_n$.

The channel processing unit $23_n$ processes the divided stream on the channel ch#n from the buffer $22_n$, and transmits a channel stream s#1 of the channel ch#n that is the processed result.

The channel processing unit $23_n$ includes a synchronization unit $31_n$, a null packet (NP) deletion unit $32_n$, a forward error correction (FEC) unit $33_n$, and a modulation (MOD) unit $34_n$.

The divided stream on the channel ch#n from the buffer $22_n$ and the time-related information from a time-related information genera on unit 27 are transmitted to the synchronization unit $31_n$. The time-related information is, for example, about the time when the packet is transmitted. The time-related information is, for example, input stream time reference (ISCR) indicating the time when the packet is transmitted. The ISCR is an input stream synchroniser (ISSY) defined in DVB-S2.

The synchronization unit $31_n$ adds the ISCR to the end of each packet of the divided stream on the channel ch#n from the buffer $22_n$. The ISCR is provided from the time-related information generation unit 27 when each packet is provided to the synchronization unit $31_n$. Then, the synchronization unit $31_n$ transmits the resulting stream as the synchronized stream on the channel ch#n to the NP deletion unit $32_n$.

The NP deletion unit $32_n$ deletes the NPs from the synchronized stream on the channel ch#n (the divided stream in which ISCR is added to each packet) from the synchronization unit $31_n$. The NP deletion unit $32_n$ provides the resulting stream as the NP-deleted stream on the channel ch#n to the FEC unit $33_n$.

As described above, the NP deletion unit $32_n$ deletes the NPs from the synchronized stream. As a result, the data rate of the resulting NP-deleted stream decreases from the data rate of the input stream by the deleted NPs. Thus, the NP-deleted stream on a channel can be transmitted in a narrower transmission bandwidth than the transmission bandwidth in which the input stream is transmitted.

The FEC unit $33_n$ functions as a generation unit that generates a stream in a BB frame defined, for example, in DVB-S2 by adding a base band (BB) header to one or more packets in the NP-deleted stream on the channel ch#n provided from the NP deletion unit $32_n$ and adding the in-band signaling defined, for example, in DVB-T2 as necessary.

Furthermore, the FEC unit $33_n$ encodes the BB frame in an error-correction encoding, for example, BCH coding or LDPC coding. Then, the FEC unit $33_n$ provides the resulting stream in the BB frame as the transmitted post-FEC stream on the channel ch#n to the MOD unit $34_n$.

The MOD unit $34_n$ symbolizes the transmitted post-FEC stream on the channel ch#n from the FEC unit $33_n$ in a unit of a predetermined number of bits, and modulates the symbols in quadrature modulation. Then, the MOD unit $34_n$ transmits the signals obtained by modulating toe symbols in quadrature modulation as the channel stream s#n on the channel ch#n.

The symbol clock generation unit 26 generates a symbol clock that is a clock at the symbol rate, and provides the symbol clock to the time-related information generation unit 27.

The time-related information generation unit 27 generates ISSY such as ISCR as the time-related information in synchronization with the symbol clock from the symbol clock generation unit 26, and provides the ISSY to (the synchronization units $31_1$ to $31_N$) of the channel processing units $23_1$ to $23_N$. Thus, the same ISSY such as ISCR is provided to all of the channel processing units $23_1$ to $23_N$ each time.

A Transmission Process

Figure 3:
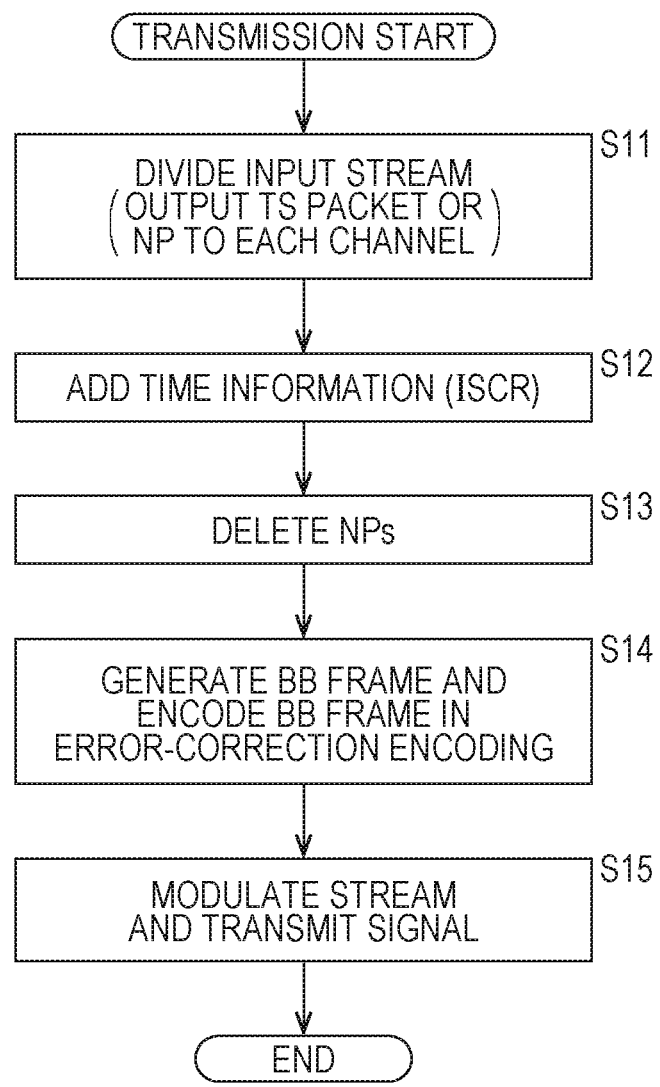
FIG. 3 is an explanatory flowchart of a process (transmission process) that the transmission device 11 performs.

FIG. 3 is an explanatory flowchart of a process (transmission process) that the transmission device 11 illustrated in FIG. 2 performs.

In step S11, the splitter divides an input ream provided thereto into the divided streams on N channels ch#1 to ch#N by distributing each TS packet of the input stream to one of the N channels ch#1 to ch#N and distributing NPs to all of the other channels. Each of the divided streams is a mixed stream of the TS packets and NPs. The splitter 21 provides the divided stream on the channel chin to the buffer $22_n$.

The buffer $22_n$ sequentially stores the divided stream on the channel ch#n provided from the splitter 21, and sequentially provides the stored divided stream on the channel ch#n to the channel processing unit $23_n$. The process goes from step S11 to step S12.

In step S12, the synchronization unit $31_n$ in the channel processing unit $23_n$ adds the ISCR provided from the time-related information generation unit 27 to the end of each packet in the divided stream of the channel ch#n from the buffer $22_n$. The synchronization unit $31_n$ provides the resulting stream as the synchronized stream on the channel ch#n to the NP deletion unit $32_n$. The process goes to step S13.

In step S13, the NP deletion unit $32_n$ deletes the NPs from the synchronized stream on the channel ch#n (the divided stream in which ISCR is added to each packet) from the synchronization unit $31_n$. The NP deletion unit $32_n$ provides the resulting stream as the NP-deleted stream on the channel chin to the FEC unit $33_n$. The process goes to step S14.

In step S14, the FEC unit $33_n$ generates a stream in a BB frame by adding a BB header to one or more packets in the NP-deleted stream on the channel ch#n provided from the NP deletion unit $32_n$, and also adding the in-band signaling as necessary.

The FEC unit $33_n$ encodes the BB frame in an error-correction encoding. The FEC unit $33_n$ provides the resulting BB frame as the transmitted post-FEC stream on the channel ch#n to the MOD unit $34_n$. The process goes from step S14 to step S15.

In step S15, the MOD unit $34_n$ modulates the transmitted post-FEC stream on the channel ch#n from the FEC unit $33_n$ in quadrature modulation. Then, the MOD unit $34_n$ transmits the signal obtained by modulating the stream in quadrature modulation as the channel stream s#n of the channel ch#n. Then, the process is completed.

Note that the transmission process in steps S11 to S15 illustrated in FIG. 3 is performed in a pipeline.

As described above, the transmission device 11 changes an input stream into an NP-deleted stream by dividing the input stream into the divided streams on N channels ch#1 to ch#N that is a mixed stream of TS packets and NPs, and deleting the NPs from the divided streams on the channel ch#n. Then, the transmission device 11 transmits the NP-deleted stream.

As a result, the data rate of the NP-deleted stream on each channel ch#n decreases from the data rate of the input stream by the deleted NPs. Thus, an input stream at a high data rate can be transmitted with a plurality of transmission channels of which transmission bandwidths are not so wide.

Furthermore, a circuit that does not perform a process at a very high rate can be used as the FEC unit $33_n$ that encodes (the BB frame generated from) the NP-deleted stream on the channel ch#n in an error-correction encoding.

An Exemplary Configuration of the Reception Device 12

Figure 4:
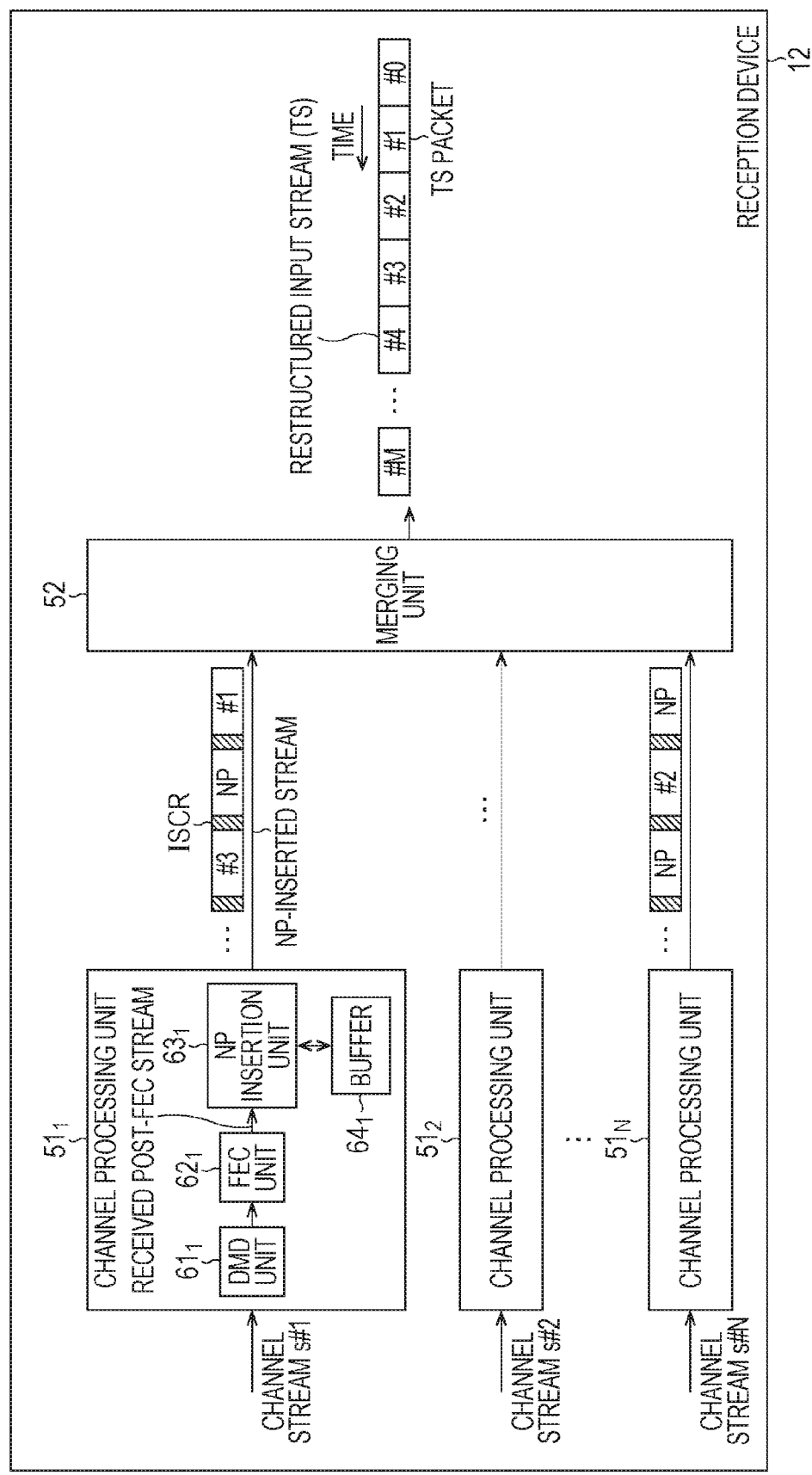
FIG. 4 is a block diagram of an exemplary configuration of a reception device 12.

FIG. 4 is a block diagram of an exemplary configuration of the reception device 12 illustrated in FIG. 1.

In FIG. 4, the reception device 12 includes N channel processing units $51_1$ to $51_N$, and a merging unit 52.

The channel processing unit $51_n$ receives and processes the channel stream s#n on the channel ch#n transmitted from the transmission device 11.

In other words, the channel processing unit $51_n$ includes a de-modulation (DMD) unit $61_n$, an FEC unit $62_n$, an NP insertion unit $63_n$, and a buffer $64_n$.

The DMD unit $61_n$ receives the channel stream s#n on the channel ch#n transmitted from the transmission device 11 and demodulates the channel stream s#n on the channel ch#n in a demodulation relative to the modulation by the MOD unit $34_n$ illustrated in FIG. 2. The DMD unit $61_n$ provides the signal on the channel ch#n obtained by demodulating the channel stream s#n to the FEC unit $62_n$.

The FEC unit $62_n$ restores the NP-deleted stream in the BB frame format provided by the FEC unit $33_n$ illustrated in FIG. 2 by decoding the error-corrected code as an error-correction relative to the error-correction encoding by the FEC unit $33_n$ illustrated in FIG. 2 for the demodulated signal on the channel ch#n from the DMD unit $61_n$. The FEC unit $62_n$ provides the restored stream as the received post-FEC stream on the channel ch#n to the NP insertion unit $63_n$.

The NP insertion unit $63_n$ provides the received post-FEC stream on the channel ch#n from the FEC unit $62_n$ to the buffer $64_n$ to store the received post-FEC stream in the buffer $64_n$.

The NP insertion unit $63_n$ properly inserts NPs into the received post-FEC stream, namely, the NP-deleted stream (in the BB frame format) by outputting the packets of the received post-FEC stream stored in the buffer $64_n$, or NP as necessary.

By this insertion, the NP insertion unit $63_n$ restores the synchronized stream on the channel ch#n provided from the synchronization unit $31_n$ to the NP deletion unit 32 in FIG. 2, and provides the restored stream as the NP-inserted stream on the channel ch#n to the merging unit 52.

The NP-inserted stream on the channel ch#n is the stream obtained by restoring the synchronized stream on the channel ch#n provided from the synchronization unit $31_n$ to the NP deletion unit 32. Thus, ISCR is added to the end of each packet in the NP-inserted stream on the channel ch#n.

The buffer $64_n$ temporarily stores the packets in the received post-FEC stream on the channel ch#n provided from the NP insertion unit $63_n$ in accordance with the control by the NP insertion unit $63_n$ and reads the stored packets.

The merging unit 52 reconstructs and outputs the input stream formed by a plurality of TS packets . . . , #0, #1, . . .

by arranging, in order of transmission time represented by the ISCR, the packets other than the NPs inserted by the NP insertion units $63_1$ to $63_N$ among the packets in the NP-inserted streams on the channel ch#1 to ch#N in accordance with the ISCR added to the end of each packet in the NP-inserted streams on the channel ch#1 to ch#N provided from the NP insertion units $63_1$ to $63_N$ in the channel processing units $51_1$ to $51_N$.

A Reception Process

Figure 5:
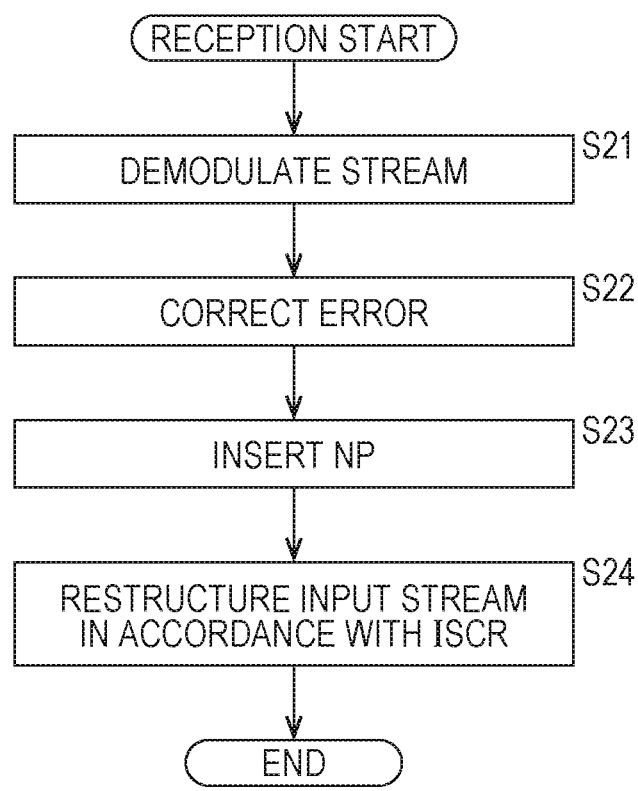
FIG. 5 is an explanatory flowchart of a process (reception process) that the reception device 12 performs.

FIG. 5 is an explanatory flowchart of a process reception process) in the reception device 12 illustrated in FIG. 4.

In step S21, the FIND unit $61_n$ of the channel processing unit $51_n$ receives and demodulates the channel stream s#n on the channel ch#n transmitted from the transmission device 11. The DMD unit $61_n$ provides the signal on the channel ch#n obtained by demodulating the channel stream s#n to the FEC unit $62_n$. Then, the process goes to step 22.

In step S22, the FEC unit $62_n$ restores the NP-deleted stream in the BB frame format by correcting the error in the demodulated signal on the channel ch#n from the DMD unit $61_n$, and provides the restored NP-deleted stream as the received post-FEC stream on the channel ch#n to the NP insertion unit $63_n$. The process goes to step S23.

In step S23, the NP insertion unit $63_n$ provides the received post-FEC stream on the channel ch#n from the FEC unit $62_n$ to the buffer $64_n$ to store the received stream in the buffer $64_n$. The NP insertion unit $63_n$ restores the synchronized stream on the channel ch#n that is the received post-FEC stream (the NP-deleted stream (in the BB frame format)) to which the NPs are properly added by outputting the packets in the received post-FEC stream stored in the buffer $64_n$ or NPs, and provides the restored stream as the NP-inserted stream on the channel ch#n to the merging unit 52.

Then, the process goes from step S23 to step S24. The merging unit 52 reconstructs and outputs the input stream formed by a plurality of TS packets . . . , #0, #1, . . . in accordance with the ISCR added to the end of each packet in the NP-inserted streams on the channel ch#1 to ch#N provided from the NP insertion units $63_1$ to $63_N$. Then, the process is completed.

Note that the process in steps S21 to S24 in FIG. 5 is performed in a pipeline.

A Stream that the Transmission System Processes

Figure 6:
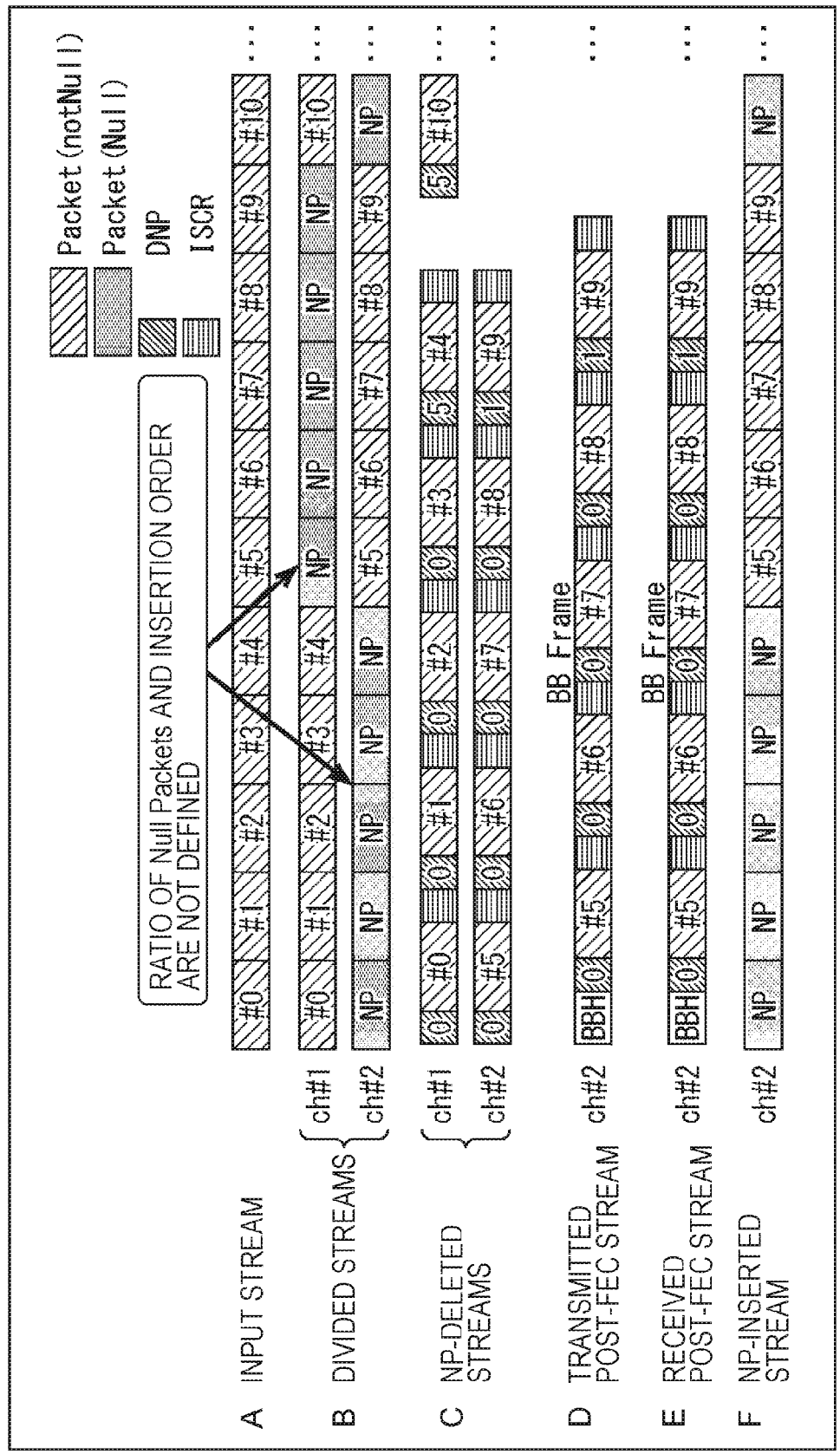
FIG. 6 is a diagram of an exemplary stream processed in the transmission system.

FIG. 6 is a diagram of an exemplary stream that the transmission system illustrated in FIG. 1 processes.

Note that the number N of channels is two in FIG. 6.

The A of FIG. 6 is an exemplary input stream to be provided to the splitter 21 in the transmission device 11 (FIG. 2).

The input stream is formed by a plurality of TS packets . . . , #0, #1, . . . .

The B of FIG. 6 is exemplary divided streams provided to the synchronization unit $31_n$ from the splitter 21 via the buffer $22_n$ in the transmission device 11 (FIG. 2).

The splitter 21 divides the input stream into two divided streams on two channels ch#1 and ch#2 by distributing each TS packet in the input stream in the A of FIG. 6 to one of the two channels ch#1 and ch#2, and distributing NP to the other channel.

For example, the splitter 21 sequentially distributes the TS packets #0 to #4 in the input stream in the A of FIG. 6 to the channel ch#1, and sequentially distributes five NPs to the channel ch#2, and then sequentially distributes the TS packets #5 to #9 to the channel ch#2, and sequentially distributes five NPs to the channel ch#1. After that, the splitter 21 similarly distributes the TS packets in the input stream to one of the two channels ch#1 and ch#2, and distributes the NPs to the other channel. As described above, the splitter 21 divides the input stream into the divided streams on the two channels ch#1 and ch#2 in the B of FIG. 6.

The C of FIG. 6 is an exemplary NP-deleted stream provided from the NP deletion unit $32_n$ to the FEC unit $33_n$ in the transmission device 11 (FIG. 2).

The synchronization unit $31_n$ changes the divided stream on the channel ch#n provided by the splitter 21 into the synchronized stream on the channel ch#n by adding ISCR to the end of each packet in the divided stream on the channel ch#n.

The NP deletion unit $32_n$ changes the synchronized stream on the channel ch#n into the NP-deleted stream on the channel ch#n by deleting the NPs from the synchronized stream on the channel ch#n.

When the NP deletion unit $32_n$ changes the synchronized stream on the channel ch#n into the NP-deleted stream on the channel ch#n by deleting the NPs from the synchronized stream on the channel ch#n, the NP deletion unit $32_n$ adds, for example, a one-byte deleted null packets (DNP), which indicates the number of NPs deleted between a packet and the next packet, to the top of each packet in the NP-deleted stream on the channel ch#n.

The C of FIG. 6 is the NP-deleted streams on the channels ch#1 and ch#2 provided from the divided streams on the channels ch#1 and ch#2 in the B of FIG. 6, respectively.

Each of the NP-deleted streams on the channels ch#1 and ch#2 is the stream obtained by adding ISCR to the end of each packet in the divided streams on the channels ch#1 and ch#2 in the B of FIG. 6, deleting the NPs together with the ISCR added to the NPs, and adding DNP to the top of each packet (each packet remaining after the NPs are deleted).

For example, there is no (zero) NP deleted by the NP deletion unit $32_n$ between the packets #0 and #1 in the divided stream on the channel ch#1. Thus, the DNP an the top of the packet #0 is zero.

For example, there are five NPs deleted by the NP deletion unit $32_n$ between the packets #4 and #10 in the divided stream on the channel ch#1. Thus, the DNP on the top of the packet #4 is five.

The D of FIG. 6 is an exemplary transmitted post-FEC stream on the channel ch#2 that the FEC unit $33_2$ in the transmission device 11 (FIG. 2) provides from the NP-deleted stream on the channel ch#2 in the C of FIG. 6.

The transmitted post-FEC stream on the channel ch#2 is the stream in the BB frame obtained by using one or more packets (including the ISCR and DNP added to each of the packets) in the NP-deleted stream on the channel ch#2 in the C of FIG. 6 as a data field (payload) and adding a BB header to the data field. In the D of FIG. 6, the packets #5 to #9 are placed in the data field of a BB frame.

Note that the in-band signaling (or a padding) is added to the end of the BB frame as necessary. However, the illustration of the in-band signaling is omitted in FIG. 6.

The E of FIG. 6 is an exemplary received post-FEC stream on the channel ch#2 provided from the FEC unit $62_2$ to the NP insertion unit $63_2$ in the reception device 12 (FIG. 4).

As described with reference to FIG. 4, the FEC unit $62_2$ restores the NP-deleted stream in the BB frame format provided by the FEC unit $33_2$ in FIG. 2, and provides the restored stream as the received post-FEC stream on the channel ch#2 to the NP insertion unit $63_2$.

Thus, the received post-FEC stream on the channel ch#2 is identical to the NP-deleted stream on the channel ch#2 in the BB frame format, namely, to the transmitted post-FEC stream on the channel ch#2 in the D of FIG. 6.

The F of FIG. 6 is an exemplary NP-inserted stream on the channel ch#2 provided from the NP insertion unit $63_2$ to the merging unit 52 in the reception device 12 (FIG. 4).

The NP-inserted stream on the channel ch#2 in the F of FIG. 6 is the stream obtained by inserting the NPs as many as the number indicated with the DNP included in the received post-FEC stream on the channel ch#2 into the packets (sequence) included in the BB frame of the received post-FEC stream on the channel ch#2 in the E of FIG. 6.

Five NPs are inserted before the packet #5 that is the top of the BB frame of the received post-FEC stream on the channel ch#2 in the E of FIG. 6 in the NP-inserted stream on the channel ch#2 in the F of FIG. 6. The DNP that indicates the insertion of the five NPs is added to the top of the last packet in a BB frame (not illustrated) just before the BB frame of the received post-FEC stream on the channel ch#2 that is the E of FIG. 6.

The DNP included in the received post-FEC stream on the channel ch#2 in the E of FIG. 6 is deleted when the NP insertion unit $63_2$ changes the received post-FEC stream on the channel ch#2 in the F of FIG. 6 into the NP-inserted stream on the channel ch#2 in the F of FIG. 6.

Note that the NP-inserted stream on the channel ch#2 in the F of FIG. 6 is the stream obtained by restoring the synchronized stream on the channel ch#2 provided from the synchronization unit $31_n$ to the NP deletion unit 32 in FIG. 2 as described with reference to FIG. 4, and thus ISCR is added to the end of each packet in the NP-inserted stream on the channel ch#2 in the F of FIG. 6. However, the illustration of the ISCRs is omitted in the F of FIG. 6.

By the way, the NP-deleted stream on the channel ch#n (n=1, or 2 in FIG. 6) in the C of FIG. 6 is the stream obtained by adding ISCR to the end of each packet in the divided streams of the channels ch#n in the B of FIG. 6, deleting the NPs together with the ISCRs added to the NPs, and adding DNP to the top of each packet.

When the NP deletion unit $32_n$ in the transmission device 11 deletes the NPs from the synchronized stream on the channel ch#n and also deletes the ISCRs added to the NPs as described above, it is difficult for the NP insertion unit $63_n$ in the reception device 12 to restore the synchronized stream on the channel ch#n provided by the synchronization unit $31_n$ in FIG. 2 as the NP-inserted stream on the channel chin.

In other words, when ISCR is added to the end of each packet in the synchronized stream on the channel ch#n provided by the synchronization unit $31_n$ in the transmission device 11 and the NP deletion unit $32_n$ deletes the ISCRs added to the NPs together with the NPs from the synchronized stream on the channel ch#n, the NP insertion unit $63_n$ in the reception device 12 can restore the NPs deleted by the NP deletion unit $32_n$ by inserting the NPs in accordance with the DNP. However, it is difficult for the NP insertion unit $63_n$ to restore the ISCRs deleted together with the NPs by the NP deletion unit $32_n$.

As a method for restoring the ISCRs deleted together with the NPs by the NP deletion unit $32_n$, there is, for example, a method in which the NP insertion unit $63_n$ restores the ISCR added to the NP to be inserted by estimating the ISCR from the ISCRs added to the packets just before and after the NP to be inserted by the NP insertion unit $63_n$, for example, with interpolation.

However, the method does not necessarily accurately restore the ISCR deleted together with the NP by the NP deletion unit $32_n$.

In light of the foregoing, when the NP deletion unit $32_n$ in the transmission device 11 deletes NP from the synchronized stream on the channel ch#n, the NP deletion unit $32_n$ can retain the ISCR added to the NP without deleting the ISCR.

This enables the NP Insertion unit $63_n$ in the reception device 12 to accurately restore the synchronized stream on the channel ch#n provided by the synchronization unit $31_n$ in FIG. 2, namely, the stream obtained by adding the ISCR, which the synchronization unit $31_n$ in FIG. 2 has added, to each packet in the divided stream on the channel ch#n as the NP-inserted stream on the channel ch#n.

As described above, FIG. 7 is a diagram of an exemplary stream that the transmission system in FIG. 1 processes when the NP deletion unit $32_n$ in the transmission device 11 deletes NP from the synchronized stream on the channel ch#n, and retains the ISCR added to the NP without deleting the ISCR.

Figure 7:
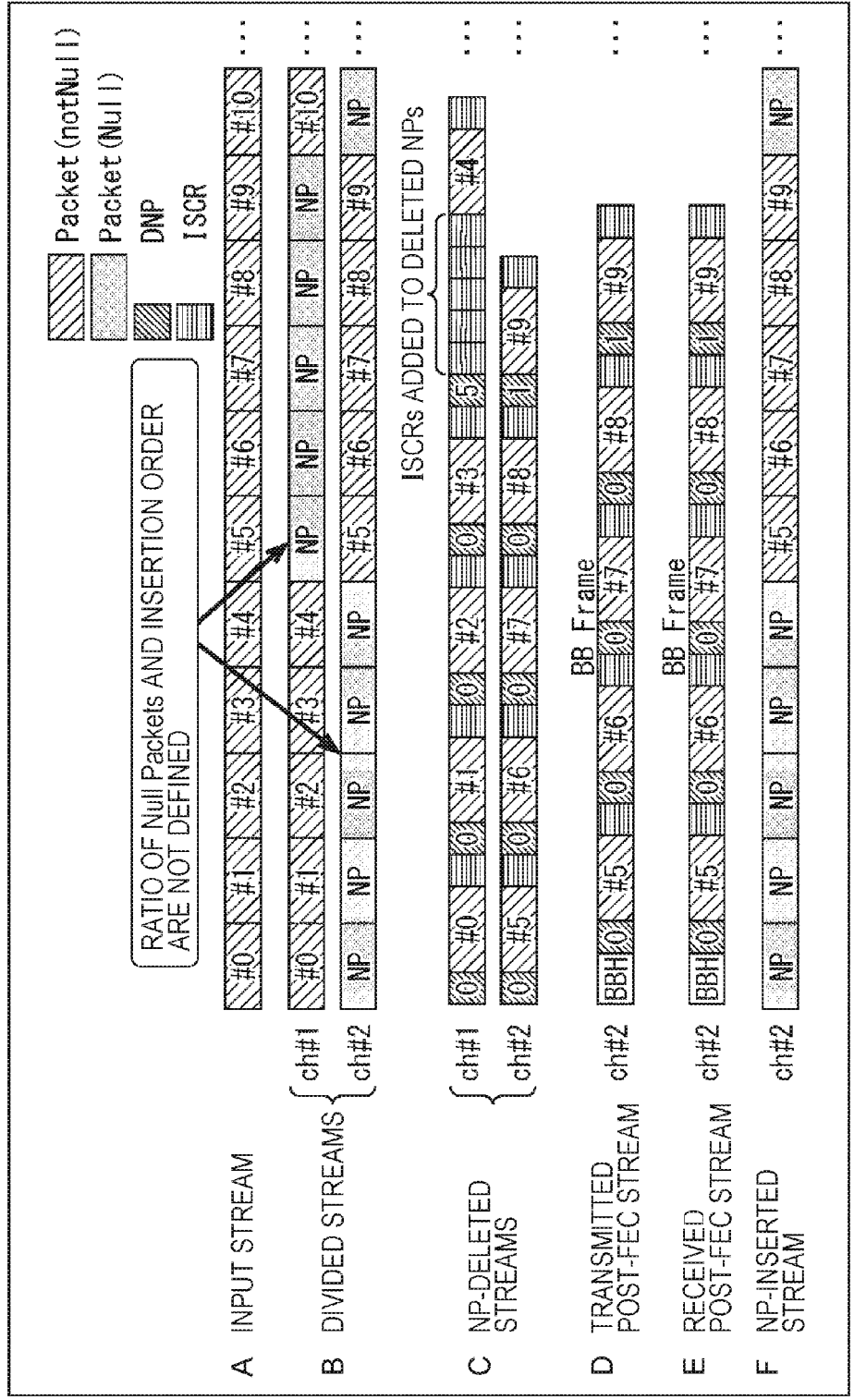
FIG. 7 is a diagram of an exemplary stream processed in the transmission system.

Note that the number N channels is two in FIG. 7, similarly to FIG. 6.

The A and B, and D to F in FIG. 7 are similar to the A and B, and D to F in FIG. 6, respectively. Thus, the descriptions will be omitted.

The C in FIG. 7 is the NP-deleted streams of the channels ch#1 and ch#2 obtained from the divided streams of the channels ch#1 and ch#2 in the B of FIG. 7, respectively.

In the C of FIG. 7, the NP-deleted stream on the channel ch#1 is the stream obtained by adding ISCR to the end of each packet in the divided stream on the channel ch#1 in the B of FIG. 7, deleting the NPs while retaining the ISCRs added to the NP, and adding DNP to the top of each packet.

After the NPs are deleted while the ISCRs added to the NPs are retained as described above, the ISCRs added to the deleted NPs exist without being added to the ends of packets in the NP-deleted stream on the channel ch#1 in the C of FIG. 7.

Figure 8:
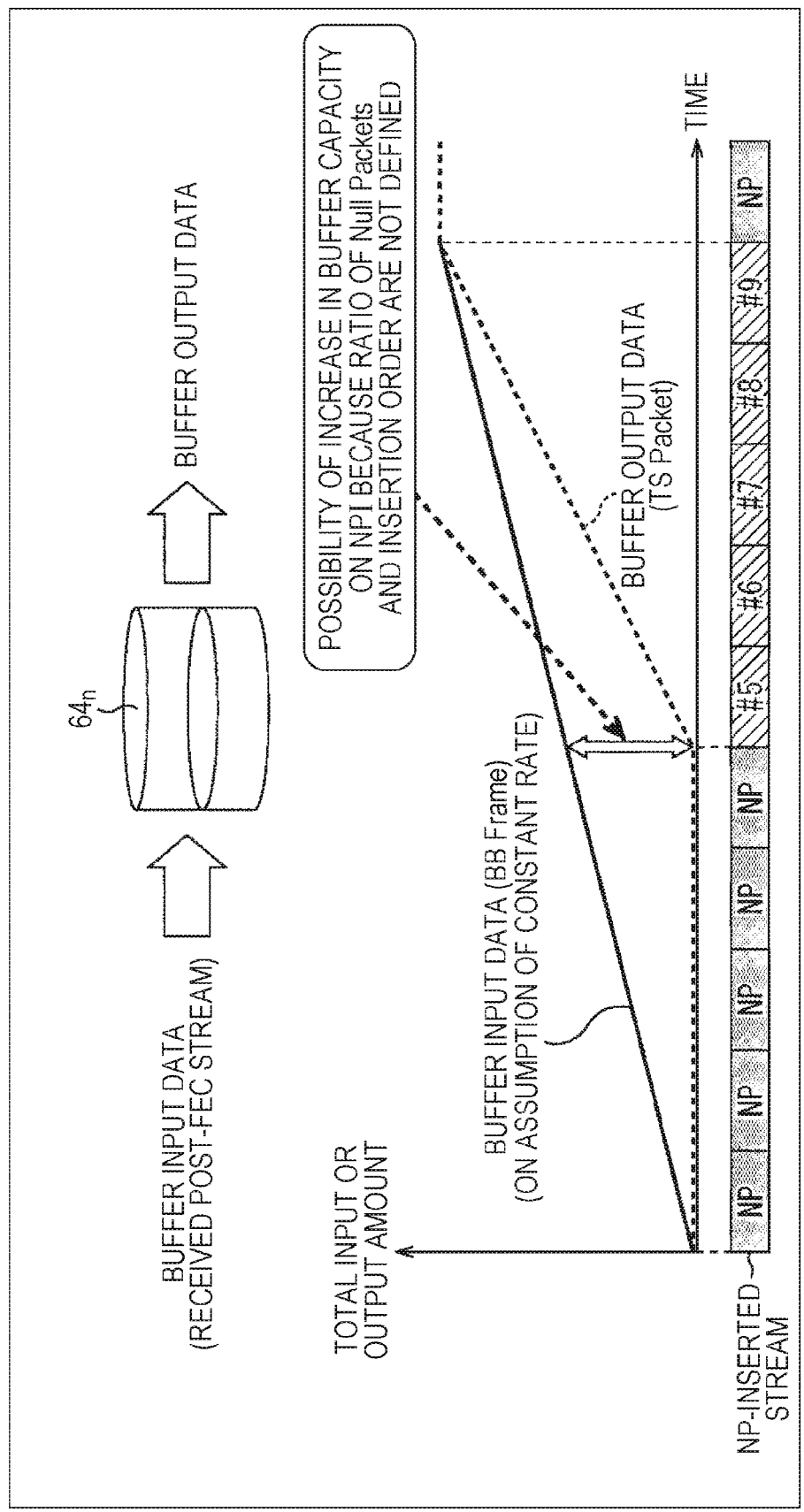
FIG. 8 is a diagram explaining that an NP insertion unit $63_n$ in the reception device 12 restores the synchronized stream on a channel ch#n as the NP-inserted stream on the channel ch#n.

Restoration of the Synchronized Stream on the Channel ch#n by the NP Insertion Unit $63_n$ FIG. 8 is a diagram explaining that the NP insertion unit $63_n$ in the reception device 12 (FIG. 4) restores the synchronized stream on the channel ch#n as the NP-inserted stream on the channel ch#n.

As described with reference to FIG. 4, the NP insertion unit $63_n$ properly inserts NPs to the received post-FEC stream (the NP-deleted stream (in the BB frame format)) by providing and storing the received post-FEC stream on the channel ch#n from the FEC unit 62 in the buffer 64 and then outputting the packets in the received post-FEC stream stored in the buffer $64_n$ or NPs. This insertion restores the synchronized stream on the channel ch#n as the NP-inserted stream on the channel ch#n.

In other words, the oldest packet among the packets that the NP insertion unit $63_n$ writes (stores) in the buffer $64_n$ and that is not read from the buffer $64_n$ in the received post-FEC stream on the channel ch#n from the FEC unit $62_n$ notable packet to be noted.

The NP insertion unit $63_n$ inserts NPs into the received post-FEC stream on the channel ch#n from the FEC unit $62_n$ by outputting NPs as many as the number indicated by the DNP added to the notable packet, and then outputting the notable packet, and restores the synchronized stream on the channel ch#n as the NP-inserted stream on the channel ch#n.

Thus, after a packet in the received post-FEC stream on the channel ch#n written in the buffer $64_n$ is determined as the notable packet, it is necessary to store the packet in the buffer $64_n$ until the completion of outputting NPs as many as the number indicated by the DNP added to the notable packet.

The data input (provided) and written to the buffer $64_n$ is referred to as the buffer input data, and the data read and output from the buffer $64_n$ is referred to as the buffer output data.

FIG. 8 illustrates exemplary temporal variations in the total amount of buffer input data and in the total amount of buffer output data.

The buffer input data is the received post-FEC stream on the channel ch#n. To simplify the description, it is assumed that the buffer input data is input at a constant data rate.

In this example, the total data amount of the buffer input data increases with a constant inclination as a solid line illustrated in FIG. 8.

On the other hand, the total data amount of the buffer output data varies as a dotted line illustrated in FIG. 8, depending on the NPs inserted into the received post-FEC stream on the channel ch#n when the synchronized stream on the channel ch#n is restored as the NP-inserted stream on the channel ch#n.

In other words, the total amount of the buffer output data increases when the NP insertion unit $63_n$ outputs the packets in the received post-FEC stream stored in the buffer $64_n$ the buffer input data because the packets in the received post-FEC stream are read from the buffer $64_n$ while the NP insertion unit $63_n$ outputs the packets in the received post-FEC stream stored in the buffer $64_n$ and NPs.

However, the total amount of the buffer output data does not vary (increase) when the NP insertion unit $63_n$ outputs the NPs because the packets in the received post-FEC stream are not read from the buffer $64_n$.

When the NP insertion unit $63_n$ sequentially inserts many NPs into the synchronized stream on the channel ch#n restored as the NP-inserted stream on the channel ch#n, namely, into the divided stream on the channel ch#n provided by the splitter 21 in the transmission device 11 (FIG. 2), the total amount of the buffer output data does not vary. This is because the packets in the received post-FEC stream are not read from the buffer $64_n$ when the NP insertion unit $63_n$ continues outputting NPs in a period in which many of the NPs are sequential.

The total data amount of the buffer input data increases with a constant inclination as described above. Thus, when the total amount of the buffer output data does not vary, the difference between the total amount of the buffer input data and the total amount of the buffer output data (hereinafter, referred to also as the total amount difference) increases.

The total amount difference is the data amount of the data stored in the buffer $64_n$. Thus, the maximum total amount difference is the buffer amount that the buffer $64_n$ needs having.

The total amount difference increases in a period in which NPs are sequential in the divided stream on the channel ch#n provided by the splitter 21 as described above because the total amount of the buffer output data does not vary.

Thus, when NP can freely be inserted without prescribing (defining) an NP insertion method in which the splitter 21 inserts NPs into the divided stream on the channel ch#n (for example, the ratio of NPs to be inserted into each channel, or the order in which the NPs are inserted into each channel), the buffer $64_n$ in the reception device 12 needs having a large buffer amount. This can increase the cost of the reception device 12.

When the buffer amount of the buffer $64_n$ in the reception device 12 is smaller than the total amount difference, this causes the overflow of the buffer $64_n$. This may causes the NP insertion unit $63_n$ to fail to properly process the received post-FEC stream on the channel ch#n from the FEC unit $62_n$ (to restore the synchronized stream on the channel ch#n as the NP-inserted stream on the channel ch#n).

In light of the foregoing, an NP insertion method is prescribed for the transmission system in FIG. 1 so that the splitter 21 divides an input stream into the divided streams of the channel ch#1 to ch#N including the packets of the input stream at a predetermined density.

According to the NP insertion method, NPs are smoothed and inserted into the divided streams of the channel ch#1 to ch#N so that the NPs are not inserted only in a part of the streams.

This can eliminate the need for a large buffer amount of the buffer $64_n$ in the reception device 12 as described above due to the fact that many NPs are sequentially inserted in a divided stream of the channel ch#n.

The data rate of the NP-deleted stream on the channel ch#n to be provided to the FEC unit $33_n$ in the transmission device 11 needs to be a predetermined data rate lower than or equal to the processing speed (the FEC rate) of the FEC unit $33_n$. This is because, when the data rate of the NP-deleted stream on the channel ch#n exceeds the processing speed of the FEC unit $33_n$, it is difficult for the FEC unit $33_n$ to properly process the NP-deleted stream on the channel ch#n.

The data rate of the NP-deleted stream on the channel ch#n to be provided to the FEC unit $33_n$ in the transmission device 11 is the throughput of the data field in the BB frame generated by the FEC unit $33_n$ (the data from which the BB header in the BB frame is removed). The data rate is determined in accordance with the symbol rate, a modulation scheme for the quadrature modulation performed by the MOD unit $34_n$, the error-corrected code used in the FEC unit $33_n$, or the on/off of the pilot signal for the modulated signal provided by the MOD unit $34_n$.

On the assumption that the data rate of the NP-deleted stream on the channel ch#n to be provided to the FEC unit $33_n$ in the transmission device 11 is previously determined as a predetermined data rate lower than or equal to the processing speed of FEC unit $33_n$, the NP insertion method can be prescribed so that the ratios of the NPs that the splitter 21 inserts into the channels ch#1 to ch#N are identical to the ratios of the reciprocals of the predetermined data rates of the NP-deleted stream on the channels ch#1 to ch#N.

According to the prescribed NP insertion method, the FEC unit $33_n$ can be prevented from failing to properly process the NP-deleted stream on the channel ch#n due to the fact that many NPs are inserted in a channel ch#n' and this decreases the number of NPs inserted into the other channel ch#n, and thus the data rate of the NP-deleted stream on the channel ch#n becomes larger than the processing speed of the FEC unit $33_n$ on the channel ch#n.

In other words, when an NP insertion method is prescribed so that the ratios of the NPs that the splitter 21 inserts into the channels ch#1 to ch#N are identical to the ratios of the reciprocals of the predetermined data rates of the NP-deleted stream on the channels ch#1 to ch#N, the data rates of the NP-deleted streams of the channels ch#1 to ch#N become the data rates lower than or equal to the processing speeds of the FEC units $33_n$ previously determined for the channels ch#1 to ch#N, respectively. This enables the FEC unit $33_n$ to properly process the NP-deleted stream on the channel ch#n.

Figure 9:
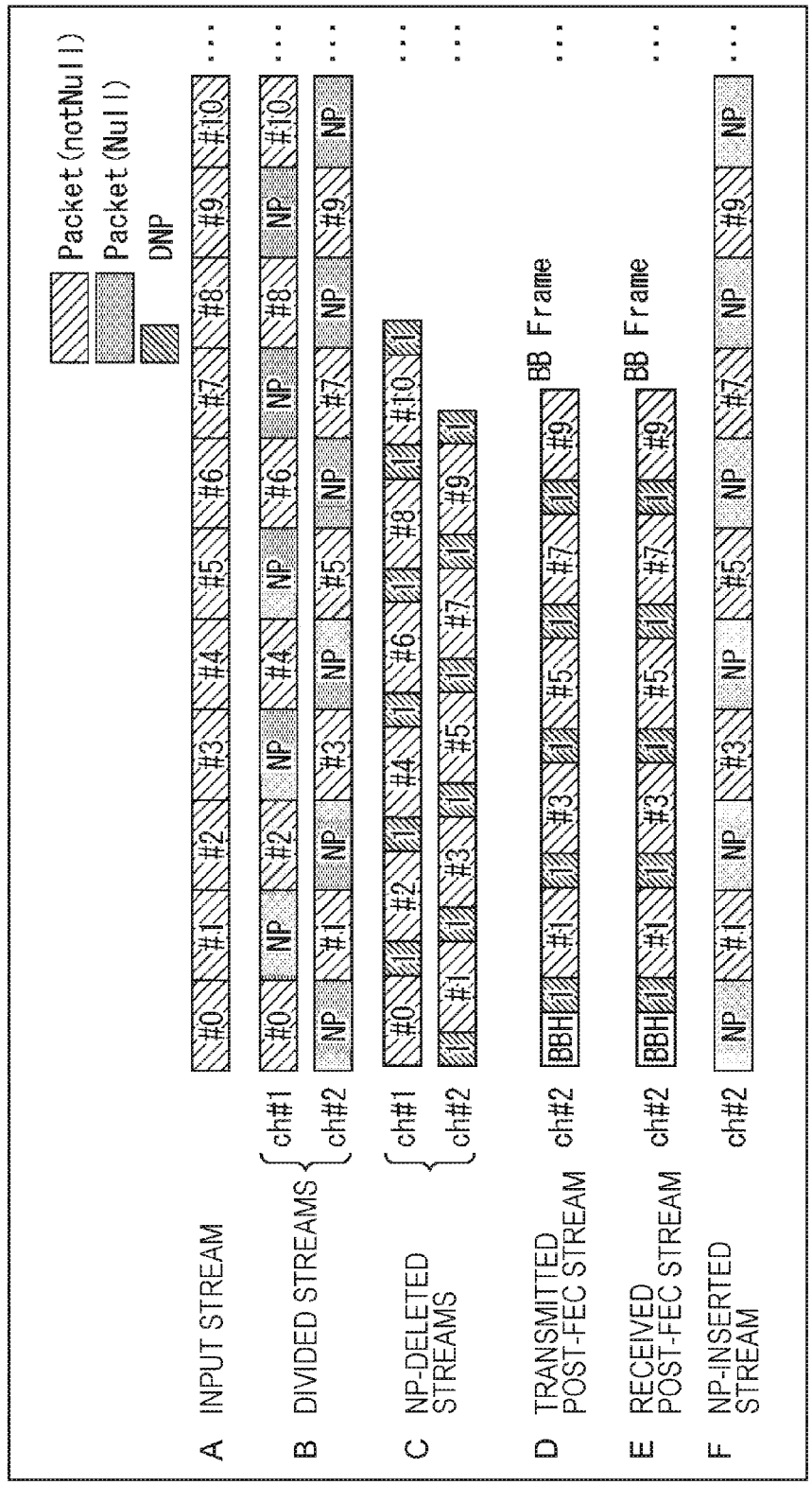
FIG. 9 is a diagram of an exemplary stream processed in the transmission system when an NP insertion method is used.

FIG. 9 is a diagram of an exemplary stream that the transmission system in FIG. 1 processes when the NP insertion method as described above is used.

Note that the number N of channels is two in FIG. 9, similarly to FIG. 6.

Furthermore, the illustration of ISCR is omitted in FIG. 9.

The A of FIG. 9 is an exemplary input stream provided to the splitter 21 in the transmission device 11 (FIG. 2).

The A of FIG. 9 is similar to the A of FIG. 6.

The B of FIG. 9 is exemplary divided streams provided from the splitter 21 in the transmission device 11 (FIG. 2) to the synchronization unit $31_n$ via the buffer $22_n$.

In accordance with the NP insertion method, the splitter 21 divides the input stream into the divided streams of the two channels ch#1 and ch#2 so that the packets in the input stream are included at a predetermined density by distributing the TS packets in the input stream in the A of FIG. 9 to one of two channels ch#1 and ch#2, and distributing NPs to the other channel.

In the B of FIG. 9, the ratios of the reciprocals of the predetermined data rates of the NP-deleted streams on the channels ch#1 and ch#2 is, for example, 1 to 1.

Thus, the splitter 21 divides the input stream into the divided streams of the channels ch#1 and ch#2 so that the ratios of NPs inserted into the channels ch#1 and ch#2 is 1 to 1.

In other words, in the B of FIG. 9, the splitter 21 distributes the TS packet #0 in the input stream to the channel ch#1, and distributes an NP to the channel ch#2. After that, the splitter 21 distributes the TS packet #2 in the input stream to the channel ch#2, and distributes an NP to the channel ch#1. The splitter 21 distributes the TS packets in the input stream alternately to the channels ch#1 and ch#2, and distributes NPs alternately to the channels ch#1 and ch#2. This divides the input stream into the divided streams of the channels ch#1 and ch#2.

As a result, the packets of the input stream are included in both of the divided streams on the channels ch#1 and ch#2 at a constant density (the density at which 0.5 packet of the input stream is included in a packet of the divided stream in the B of FIG. 9).

The C of FIG. 9 is exemplary NP-deleted streams provided from the NP deletion unit $32_n$ to the FEC unit $33_n$ in the transmission device 11 (FIG. 2).

The synchronization unit $31_n$ changes the divided stream on the channel ch#n provided by the splitter 21 into the synchronized stream on the channel ch#n.

The NP deletion unit $32_n$ changes the synchronized stream on the channel ch#n into an NP-deleted stream on the channel ch#n by deleting the NPs from the synchronized stream and inserting DNPs.

The C of FIG. 9 is the NP-deleted streams on the channels ch#1 and ch#2 provided from the divided streams on the channels ch#1 and ch#2 in the B of FIG. 9, respectively.

The D of FIG. 9 is an exemplary transmitted post-FEC stream on the channel ch#2 changed from the NP-deleted stream on the channel ch#2 in the C of FIG. 9 by the FEC unit $33_2$ in the transmission device 11 (FIG. 2).

The transmitted post-FEC stream on the channel ch#2 is a BB frame stream in which a BB header is added to one or more packets of the NP-deleted stream on the channel ch#2 in the C of FIG. 9.

The E of FIG. 9 is an exemplary received post-FEC stream on the channel ch#2 provided from the FEC unit $62_2$ to the NP insertion unit $63_2$ in the reception device 12 (FIG. 4).

As described with reference to FIG. 4, the FEC unit $62_2$ restores the NP-deleted stream in the BB frame format provided by the FEC unit $33_2$ in FIG. 2, and provides the restored stream as the received post-FEC stream on the channel ch#2 to the NP insertion unit $63_2$.

Thus, the received post-FEC stream on the channel ch#2 is identical to the NP-deleted stream in the BB frame format on the channel ch#2, namely, the transmitted post-FEC stream on the channel ch#2 in the D of FIG. 9.

The F of FIG. 9 is an exemplary NP-inserted stream on the channel ch#2 provided from the NP insertion unit $63_2$ to the merging unit 52 in the reception device 12 (FIG. 4).

The NP-inserted stream on the channel ch#2 in the F of FIG. 9 is the stream obtained by inserting NPs as many as the number indicated with the DNPs included in the received post-FEC stream on the channel ch#2 into the packets (sequence) included in the BB frame of the received post-FEC stream on the channel ch#2 in the E of FIG. 9, and deleting the DNPs.

Figure 10:
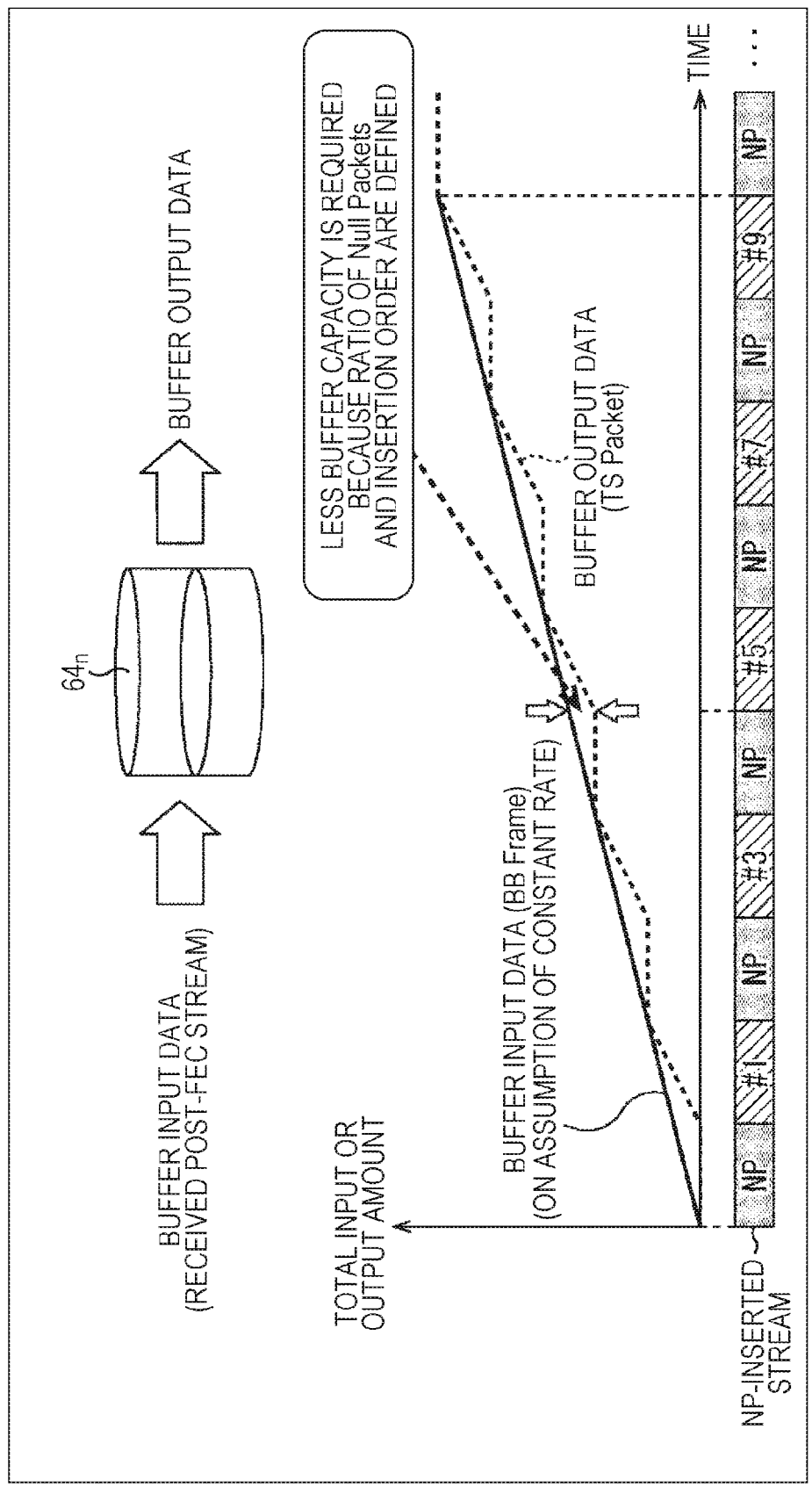
FIG. 10 is a diagram of exemplary temporal variation in the total amount of buffer input data and in the total amount of buffer output data when an NP insertion method is used.

FIG. 10 is a diagram of exemplary temporal variations in the total amount of the buffer input data and in the total amount of the buffer output data when the NP insertion method described above is used in the splitter 21.

Similarly to FIG. 8, it is assumed in FIG. 10 that the buffer input data that is the received post-FEC stream on the channel ch#n is input at a constant data rate. In this example, the total data amount of the buffer input data increases with a constant inclination as a solid line illustrated in FIG. 10.

On the other hand, using the NP insertion method divides the input stream into the divided streams on the channels ch#1 to ch#N including the packets of the input stream at a constant density.

Thus, the packets of the input stream exist at a constant density in the synchronized stream on the channel ch#n that the NP insertion unit $63_n$ in the reception device 12 restores as the NP-inserted stream on the channel ch#n from the divided streams of the channel ch#n.

Thus, when the NP insertion unit $63_n$ restores the synchronized stream on the channel ch#n as the NP-inserted stream on the channel ch#n, the packets stored in the buffer $64_n$ are read at average intervals. This increases the total amount of the buffer output data at average intervals, as a dotted line illustrated in FIG. 10.

This can eliminate the need for a large buffer amount of the buffer $64_n$ due to the fact that the NP insertion unit $63_n$ sequentially outputs NPs and the packets are not read from the buffer $64_n$ when the NP insertion unit $63_n$ restores the synchronized stream on the channel ch#n as the NP-inserted stream on the channel ch#n, and this increases the total amount difference between the total data amount of the buffer input data and the total data amount of the buffer output data.

Note that FIG. 10 illustrates the total amount of the buffer output data when the splitter 21 divides the input stream into the divided streams on the channels ch#1 and ch#2 alternately including the NPs and packets of the input stream one by one illustrated as the B of FIG. 9.

An Exemplary Configuration of the Splitter 21

Figure 11:
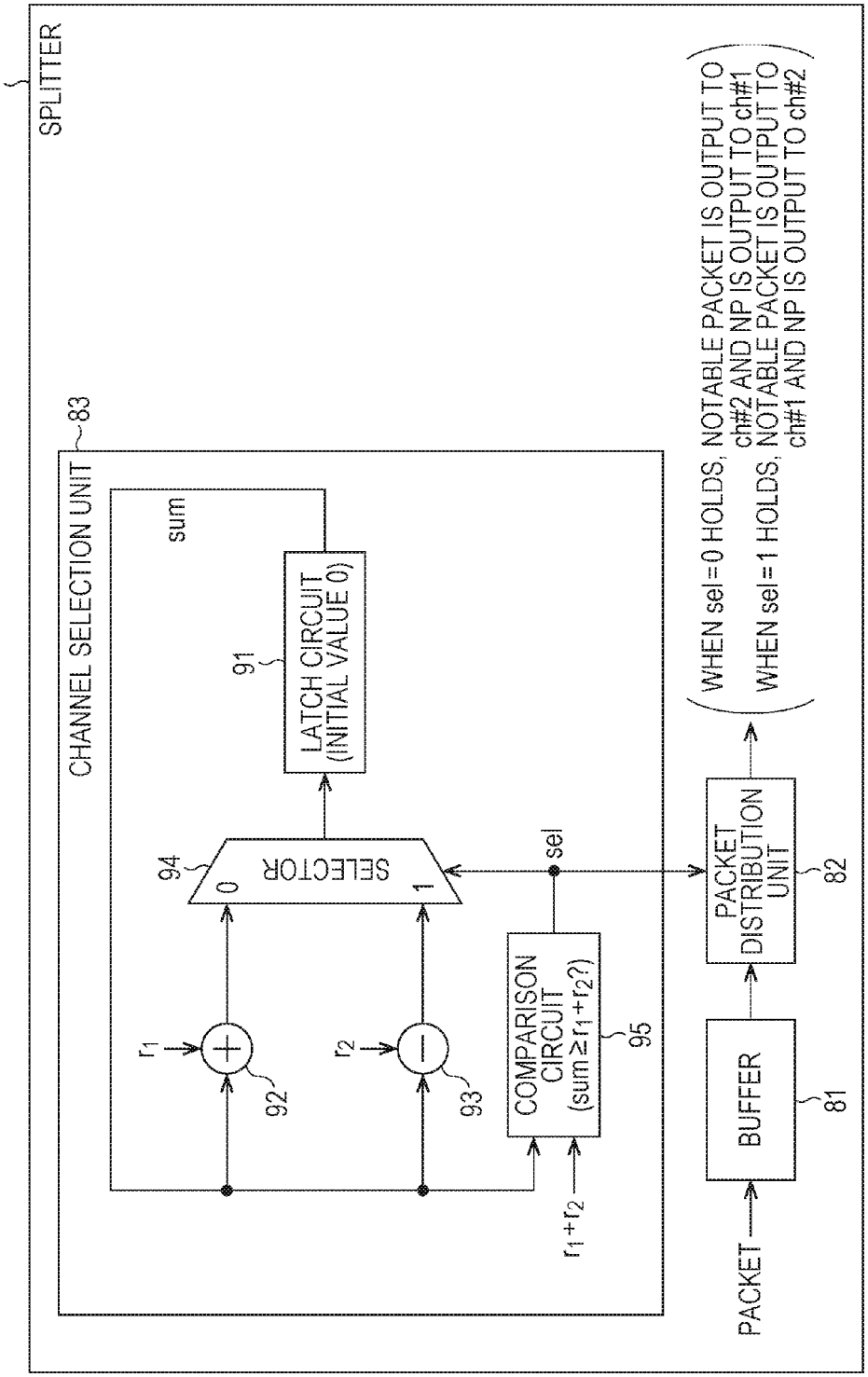
FIG. 11 is a block diagram of a first exemplary configuration of a splitter 21.

FIG. 11 is a block diagram of a first exemplary configuration of the splitter 21 that divides an input stream into divided streams in accordance with the NP insertion method described above.

In other words, FIG. 11 illustrates an exemplary configuration of the splitter 21 when the splitter 21 divides an input stream into the divided streams of two channels ch#1 and ch#2.

In FIG. 11, the splitter 21 includes a buffer 81, a packet distribution unit 82, and a channel selection unit 83.

The packets in the input stream are provided to the buffer 81. The buffer 81 sequentially stores the provided packets of the input stream.

The channel selection unit 83 provides a selection signal sel used to select a channel to which a packet is distributed to the packet distribution unit 82.

The packet distribution unit 82 reads the oldest packet among the packets stored in the buffer 81 as a notable packet to be noted. Furthermore, the packet distribution unit 82 selects a channel to which the notable packet is to be distributed as the distribution channel in accordance with the selection signal set from the channel selection unit 83, and distributes (outputs) the notable packet to the distribution channel.

In FIG. 11, the packet distribution unit 82 selects one of the two channels ch#1 and ch#2 as the distribution channel, and distributes the notable packet to the distribution channel.

The packet distribution unit 82 distributes (outputs) an NP to the channel that is not selected as the distribution channel.

The channel selection unit 83 includes a latch circuit 91, arithmetic units 92 and 93, a selector 94, and a comparison circuit 95.

The channel selection unit 83 generates a selection signal sel used to select a channel to which a notable packet is distributed (a distribution channel) in accordance with a predetermined data rate of the NP-deleted stream on the channel ch#n (hereinafter, also referred to merely the data rate on the channel ch#n), and provides the generated signal to the packet distribution unit 82.

In other words, in this example, the data rates of the channels ch#1 and ch#2 are referred to as $r_1$ and $r_2$, respectively.

The latch circuit 91 latches a value sum provided from the selector 94 at a timing in synchronization with the packets of the input stream on the assumption that the initial value is zero, and provides the value sum to the arithmetic units 92 and 93, and the comparison circuit 95 in the channel selection unit 83.

The arithmetic unit 92 adds the value sum from the latch circuit 91 to a data rate $r_1$ on the channel ch#1, and provides the resulting added value as a new candidate of the value sum=sum+$r_1$ to the selector 94.

The arithmetic unit 93 adds the value sum from the latch circuit 91 to a data rate $r_2$ on the channel ch#2, and provides the resulting added value as a new candidate of the value sum=sum+$r_2$ to the selector 94.

In addition to the added values provided from the arithmetic units 92 and 93 as described above, the selection signal sel is provided from the comparison circuit 95 to the selector 94.

In this example, the selection signal sel takes a value of zero or one. The selection signal sel having a value of zero indicates that the channel ch#2 is selected as the distribution channel. The selection signal sel having a value of one indicates that the channel ch#1 is selected as the distribution channel.

The selector 94 selects the added value from the arithmetic unit 92 or the added value from the arithmetic unit 93 in accordance with the selection signal sel from the comparison circuit 95, and provides the selected value to the latch circuit 91.

The comparison circuit 95 compares the value sum from the latch circuit 91 with the added value $r_1+r_2$ of the data rates of the channels ch#1 and ch#2. Then, the comparison circuit 95 outputs the selection signal sel having a value of one when the value sum is larger than or equal to the added value $r_1+r_2$. The comparison circuit 95 outputs the selection signal sel having a value of zero when the value sum is less than the added value $r_1+r_2$.

The selection signal sel output from the comparison circuit 95 is provided to the packet distribution unit 82, and the selector 94.

In the splitter 21 having the configuration described above, the channel selection unit 83 generates a selection signal used to select a channel to which a notable packet is distributed (a distribution channel) in accordance with the data rates $r_1$ and $r_2$ of the channels ch#1 and ch#2 so that the ratios of the NPs inserted into the channels ch#1 and ch#2 are identical to the ratios of the reciprocals of the data rates $r_1$ and $r_2$ of the channels ch#1 and ch#2. Then, the channel selection unit 83 provides the generated signal to the packet distribution unit 82.

In other words, the channel selection unit 83 generates the selection signal sel so that the channel ch#1 is selected as the distribution channel every $(r_1+r_2)/r_1$ packets and the channel ch#2 is selected as the distribution channel every $(r_1+r_2)/r_2$ packets.

The packet distribution unit 82 selects one of the channels ch#1 and ch#2 as the distribution channel in accordance with the selection signal sel from the channel selection unit 83. The packet distribution unit 82 distributes (outputs) the notable packet stored in the buffer 81 to the selected distribution channel, and distributes (outputs) an NP to the other channel.

Figure 12:
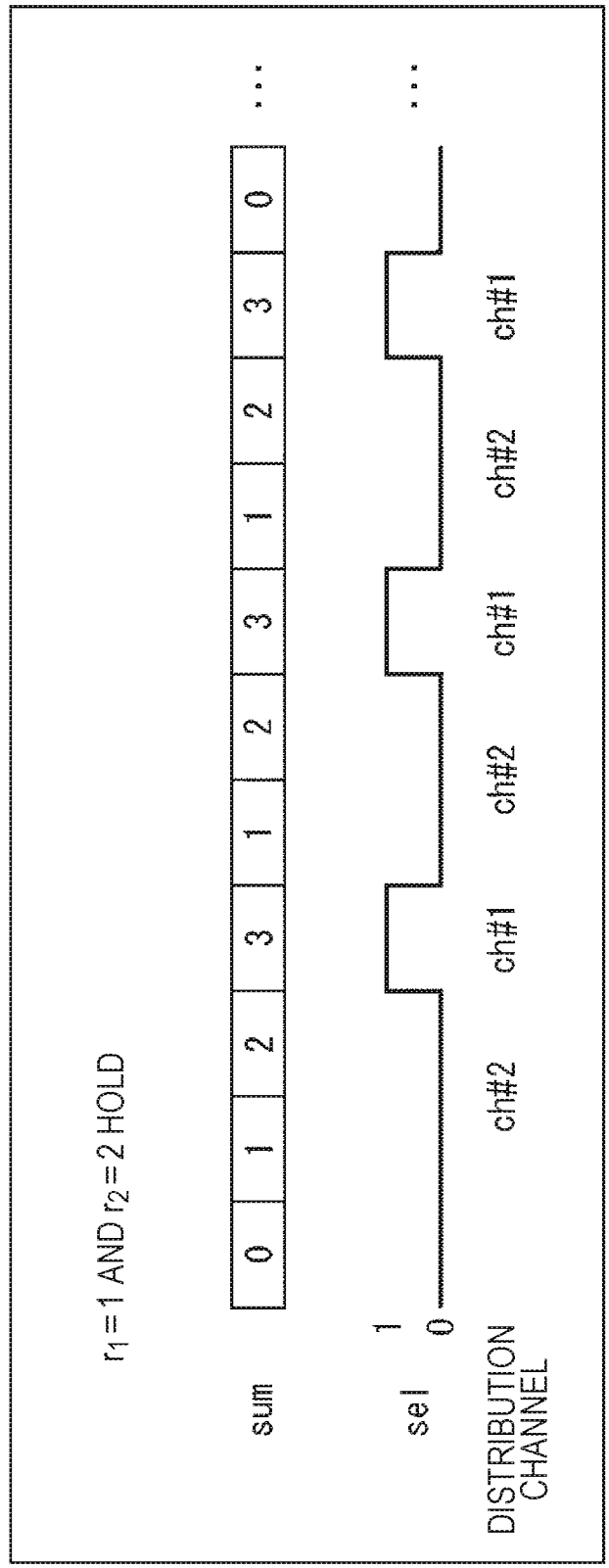
FIG. 12 is an explanatory diagram of the operation of the splitter 21.

FIG. 12 is an explanatory diagram of the operation of the splitter 21 illustrated in FIG. 11 when the data rates $r_1$ and $r_2$ are one and two, respectively.

When the data rates $r_1$ and $r_2$ are one and two, respectively, the value sum varies as illustrated in FIG. 12. When the value sum is larger than or equal to $r_1+r_2=3$, the selection signal sel is one, and the channel ch#1 is selected as the distribution channel.

When the value sum is less than $r_1+r_2=3$, the selection signal sel is zero, and the channel ch#2 is selected as the distribution channel.

In FIG. 12, the ratios of the NPs inserted into the channel ch#1 and ch#2 (the ratios of the rates that the channels ch#1 and ch#2 are not selected as the distribution channel) are identical to the ratio $1/r_1:1/r_2=1:1/2=2:1$ of the reciprocals of the data rates $r_1$ and $r_2$ of the channels ch#1 and ch#2.

In FIG. 12, the selection signal sel is generated so that the channel ch#1 is selected as the distribution channel every $(r_1+r_2)/r_1$=three packets (a packet in three packets). The channel ch#2 is selected as the distribution channel every $(r_1+r_2)/r_2=1.5$ packets, namely, ever other packet or two packets.

Figure 13:
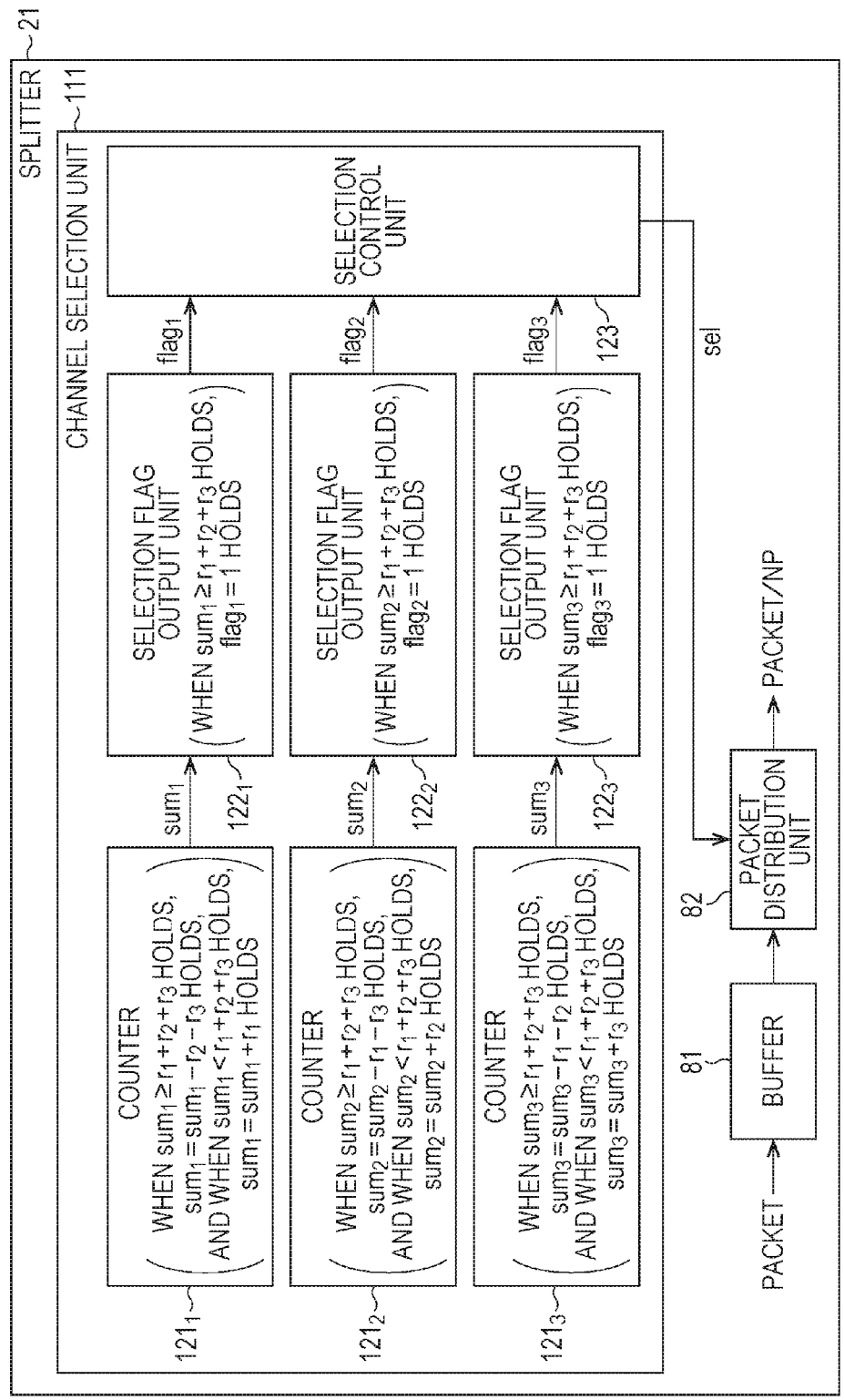
FIG. 13 is a block diagram of a second exemplary configuration of the splitter 21.

FIG. 13 is a block diagram of a second exemplary configuration of the splitter 21 that divides an input stream into divided streams in accordance with the NP insertion method described above.

In other words, FIG. 13 illustrates an exemplary configuration of the splitter 21 when the splitter 21 divides an input stream into the divided streams of three channels ch#1 to ch#3.

Note that the components in FIG. 13 corresponding to those in FIG. 11 are put with the same reference signs. The descriptions will properly be omitted hereinafter.

Similarly to the splitter 21 in FIG. 11, the splitter 21 in FIG. 13 includes a buffer 81 and a packet distribution unit 82.

However, differently from the splitter 21 in FIG. 11, the splitter 21 in FIG. 13 includes a channel selection unit 111 instead of the channel selection unit 83.

Similarly to the channel selection unit 83 in FIG. 11, the channel selection unit 111 generates a selection signal sel used to select a channel to which a notable packet is distributed in accordance with the data rates of the channels ch#1 to ch#3, and provides the generated signal to the packet distribution unit 82.

However, the channel selection unit 111 provides a selection flag $flag_n$, which indicates whether the channel ch#n (n=1, 2, or 3 in FIG. 13) is selected as the distribution channel, as the selection signal sel to the packet distribution unit 82.

The selection flag $flag_n$ takes a value of zero or one. The selection flag $flag_n$ having a value of one indicates that the channel ch#n is (can be) selected as the distribution channel. The selection flag $flag_n$ having a value of zero indicates that the channel ch#n is not selected as the distribution channel.

In this example, the packet distribution unit 82 in FIG. 13, which receives the selection flag $flag_n$ described above as the selection signal sel, selects a channel ch#n from the channels ch#1 to ch#3 as the distribution channel when the selection flag $flag_n$ provided as the selection signal set is one, and provides the notable packet to the channel ch#n that is the distribution channel.

The packet distribution unit 82 also distributes an NP to all of the channels that are not selected as the distribution channel among the channels ch#1 to ch#3.

The channel selection unit 83 includes counters $121_1$ to $121_3$ and selected flag output unit $122_1$ to $122_3$ for the channels ch#1 to ch#3, and a selection control unit 123.

In this example, the data rates of the channels ch#1, ch#2, and ch#3 are referred to as $r_1$, $r_2$ and $r_3$, respectively.

The counter $121_1$ counts a count value $sum_1$ at a timing in synchronization with a packet in the input stream, and provides the count value $sum_1$ to the selected flag output unit $122_1$.

In other words, the counter $121_1$ updates the count value $sum_1$ in accordance with an expression $sum_1=sum_1-r_2-r_3$ when the value $sum_1$ is larger than or equal to the value $r_1+r_2+r_3$, and provides the updated value to the selected flag output unit $122_1$.

Alternatively, the counter $121_1$ updates the count value $sum_1$ in accordance with an expression $sum_1=sum_1+r_1$ when the value $sum_1$ is less than the value $r_1+r_2+r_3$, and provides the updated value to the selected flag output unit $122_1$.

The counter $121_2$ counts a count value $sum_2$ at a timing in synchronization with a packet in the input stream, and provides the count value $sum_2$ to the selected flag output unit $122_2$.

In other words, the counter $121_2$ updates the count value $sum_2$ in accordance with an expression $sum_2=sum_2-r_1-r_3$ when the value $sum_2$ is larger than or equal to the value $r_1+r_2+r_3$, and provides the updated value to the selected flag output unit $122_2$.

Alternatively, the counter $121_2$ updates the count value $sum_2$ in accordance with an expression $sum_2=sum_2+r_2$ when the value $sum_2$ is less than the value $r_1+r_2+r_3$, and provides the updated value to the selected flag output unit $122_2$.

The counter $121_3$ counts a count value $sum_3$ at a timing in synchronization with a packet in the input stream, and provides the count value $sum_3$ to the selected flag output unit $122_3$.

In other words, the counter $121_3$ updates the count value $sum_3$ in accordance with an expression $sum_3=sum_3-r_1-r_2$ when the value $sum_3$ is larger than or equal to the value $r_1+r_2+r_3$, and provides the updated value to the selected flag output unit $122_3$.

Alternatively, the counter $121_3$ updates the count value $sum_3$ in accordance with an expression $sum_3=sum_3+r_3$ when the value $sum_3$ is less than the value $r_1+r_2+r_3$, and provides the updated value to the selected flag output unit $122_3$.

The selected flag output unit $122_n$ outputs the selection flag $flag_n$ having a value of zero as the default to the selection control unit 123.

When the count value sum provided from the counter $121_n$ is larger than or equal to the value $r_1+r_2+r_3$, the selected flag output unit $122_n$ outputs the selection flag $flag_n$ having a value of one to the selection control unit 123.

The selection control unit 123 selects one of the selection flags $flag_n$ having a value of one among the selection flags $flag_1$ to $flag_3$ from the selected flag output unit $122_1$ to $122_3$ as the selection signal sel, and provides the selected flag to the packet distribution unit 82.

The selection control unit 123 controls the selected flag output unit $122_n$ to reset the value of the selection flags $flag_n$ selected as the selection signal sel to zero.

In this example, the selection flag $flag_1$ is selected as the selection signal sel when the selection flag $flag_1$ is one on the assumption that the selection control unit 123 selects one of the selection flags $flag_1$, $flag_2$, and $flag_3$ as the selection signal sel, for example, in ascending order as the order of priority.

When the selection flag $flag_1$ is zero and the selection flag $flag_2$ one, the selection flag $flag_2$ is selected as the selection signal sel.

When both of the selection flags $flag_1$ and $flag_2$ are zero and the selection flag $flag_3$ is one, the selection flag $flag_3$ is selected as the selection signal sel.

In the splitter 21 having the configuration described above, the channel selection unit 111 generates a selection signal sel used to select a channel to which a notable packet is distributed in accordance with the data rates $r_1$ to $r_3$ of the channels ch#1 to ch#3 so that the ratios of the NPs inserted into the channels ch#1 to ch#3 are identical to the ratios of the reciprocals of the data rate $r_1$ to rate $r_3$ on the channels ch#1 to ch#3. Then, the channel selection unit 83 provides the generated signal to the packet distribution unit 82.

In other words, the channel selection unit 111 generates the selection signal set so that the channel ch#1 is selected as the distribution channel every $(r_1+r_2+r_3)/r_1$ packets, the channel ch#2 is selected as the distribution channel every $(r_1+r_2+r_3)/r_2$ packets, and the channel ch#3 is selected as the distribution channel every $(r_1+r_2+r_3)/r_3$ packets.

The packet distribution unit 82 selects a channels ch#n from the channels ch#1 to ch#3 as the distribution channel in accordance with the selection signal sel from the channel selection unit 111. The packet distribution unit 82 distributes (outputs) the notable packet stored in the buffer 81 to the selected distribution channel, and distributes (outputs) an NP to the other two channels.

The configuration illustrated in FIG. 13 can be used for a splitter 21 that divides an input stream into the divided streams on two channels or that divides an input stream into the divided streams on four or more channels.

A Process When an Input Stream Includes NP

Figure 14:
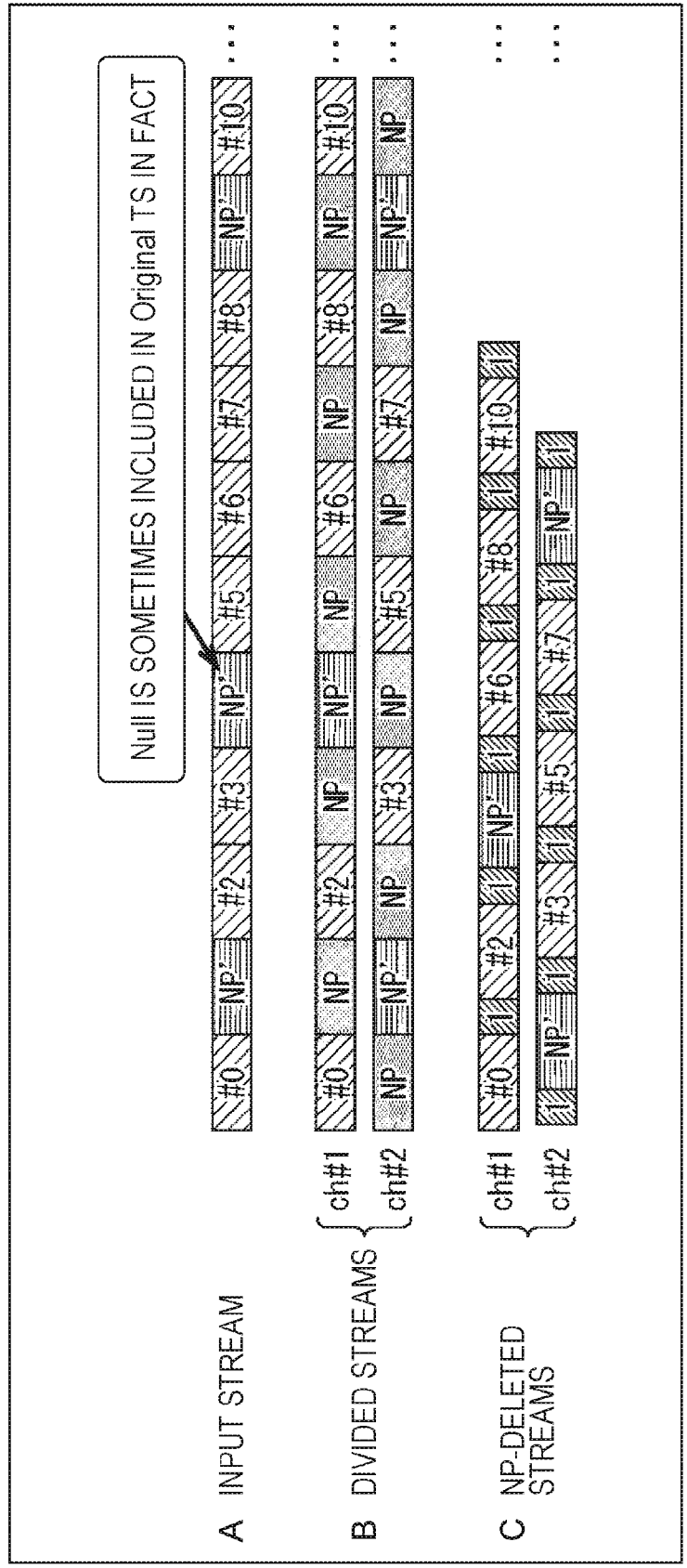
FIG. 14 is an explanatory diagram of an exemplary process when the transmission device 11 processes an input stream including NP.

FIG. 14 is an explanatory diagram of an exemplary process that the transmission device 11 processes an input stream including NP.

In other words, FIG. 14 illustrates exemplary input stream, divided streams, and NP-deleted streams.

Note that the number N of channels is two and the illustration of ISCR is omitted in FIG. 14.

The A of FIG. 14 is an exemplary input stream including NPs.

Note that the NP included in the input stream is referred to as NP' in FIG. 14 in order to distinguish the NPs from the NPs inserted into the divided streams in the splitter 21.

The B of FIG. 14 is exemplary divided streams on two channels ch#1 and ch#2 that the splitter 21 generates from the input stream in t e A of FIG. 14.

The divided streams include the NPs inserted in the splitter 21 and the NP's (originally) included in the input stream.

The C of FIG. 14 is exemplary NP-deleted streams on the two channels ch#1 and ch#2 provided from the divided streams of the two channels ch#1 and ch#2 in the B of FIG. 14 in the NP deletion unit $32_n$.

The NP deletion unit 32 generates the NP-deleted streams by deleting the NPs from (the synchronized stream that the synchronization unit $31_n$ generates from) the divided streams as described above.

As illustrated in the B of FIG. 14, the divided streams sometimes include the NPs inserted when the splitter 21 generates the divided streams and the NP's originally included in the input stream in this example.

When the divided streams include the NPs and the NP's and the NP deletion unit $32_n$ deletes the NP's in addition to the NPs, the NP insertion unit $63_n$ in the reception device 12 needs inserting also the NP's in addition to the NPs when the NP insertion unit $63_n$ generates an NP-inserted stream.

When the NP insertion unit $63_n$ sequentially inserts many NPs (NP's), the buffer 64 needs having a large buffer amount because the packets are not read from the buffer $64_n$ as described with reference to FIG. 8.

In light of the foregoing, the NP deletion unit $32_n$ in the transmission device 11 deletes only the NPs inserted when the splitter 21 generates the divided streams, and can retain the NP's originally included in the input stream without deleting the NP's.

Retaining the NP's originally included in the input stream as they are without deleting the NP's as described above can prevent the buffer $64_n$ in the reception device 12 from requiring to have a large buffer amount.

In the NP-deleted streams in the C of FIG. 14, only the NPs inserted with the splitter 21 and included in the divided streams in the B of FIG. 14 are deleted and the NP's originally included in the input stream are not deleted and are retained as they are.

Figure 15:
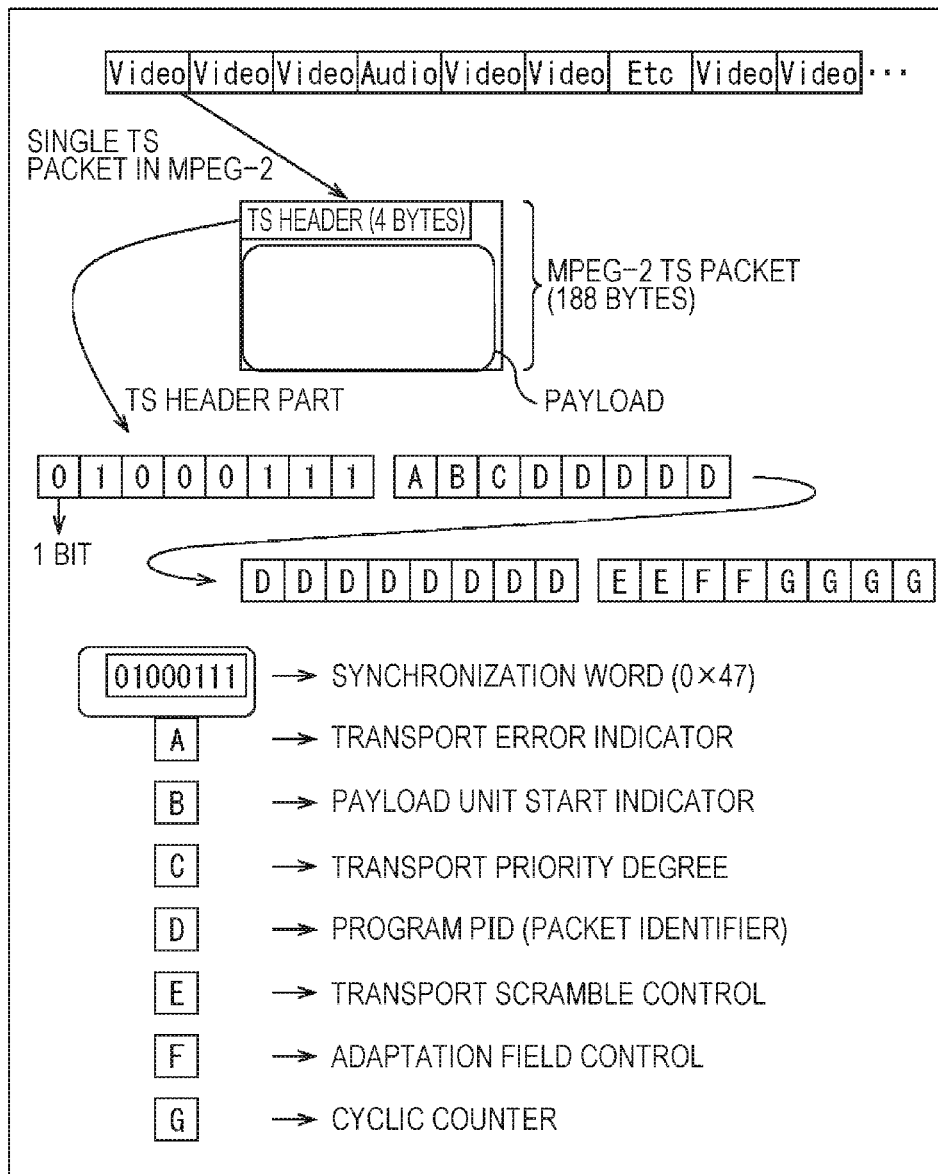
FIG. 15 is an explanatory diagram is an exemplary method for distinguishing the NP inserted by the splitter 21 from the NP' originally included in the input stream.

FIG. 15 is an explanatory diagram of an exemplary method for distinguishing the NPs inserted with the splitter 21 from the NP's originally included in the input stream.

It is necessary to distinguish the NPs inserted with the splitter 21 from the NP's originally included in the input stream in order to enable the NP deletion unit $32_n$ in the transmission device 11 to delete only the NPs inserted with the splitter 21 from (the synchronized stream obtained from) the divided streams, and to retain the NP's originally included in the input stream as they are without deleting the NP's.

As a method for distinguishing the NPs inserted with the splitter 21 from the NP's originally included in the input stream, there is a method in which the NULL identification information, which indicates that the TS packet is the NP inserted with the splitter 21 or is the NP' originally included in the input stream, is included in a TS packet that is NP or NP'.

FIG. 15 illustrates the format of a TS packet.

The TS header of the TS packet includes a program PID so that it can be recognized from the program PID whether the TS packet is NP (NP').

The NULL identification information can be, for example, that one is put into the most significant bit of the fixed synchronization word 0x47 included in the TS header (0x indicates that the subsequent values are displayed in hexadecimal notation), and the synchronization word is 0xC7.

Alternatively, the NULL identification information can be, for example, that a part or whole of the payload of the TS packet (that is NP or NP') is specific values indicating that the TS packet is NP or NP'. For example, a bit string in which the most significant bit is one and the other bits are zero can be used as the specific values.

Note that the NULL identification information can be that the NULL identification information indicating that the TS packet is NP is included only in the NP, that the NULL identification information indicating that the TS packet is NP' is included only in the NP', or that the NULL identification information indicating that the TS packet is NP is included in the NP and the NULL identification information indicating that the TS packet is NP' is included in the NP'.

However, when the NULL identification information indicating that the TS packet is NP' is included in the NP', it is necessary to return the NP' to the state before the NULL identification information is included in the NP' for the process that the NP deletion unit $32_n$ performs later.

Thus, the NULL identification information is preferably that the NULL identification information indicating that the TS packet is NP is included only in the NP.

The NP including the NULL identification information indicating that the TS packet is NP does not affect the process that the NP deletion unit $32_n$ performs later because the NP deletion unit $32_n$ deletes the NULL identification information (it is not necessary to return the NP including the NULL identification information indicating that the TS packet is NP to the state before the NULL identification information is included in the NP).

A Size Identifier Indicating the Size of DNP

Figure 16:
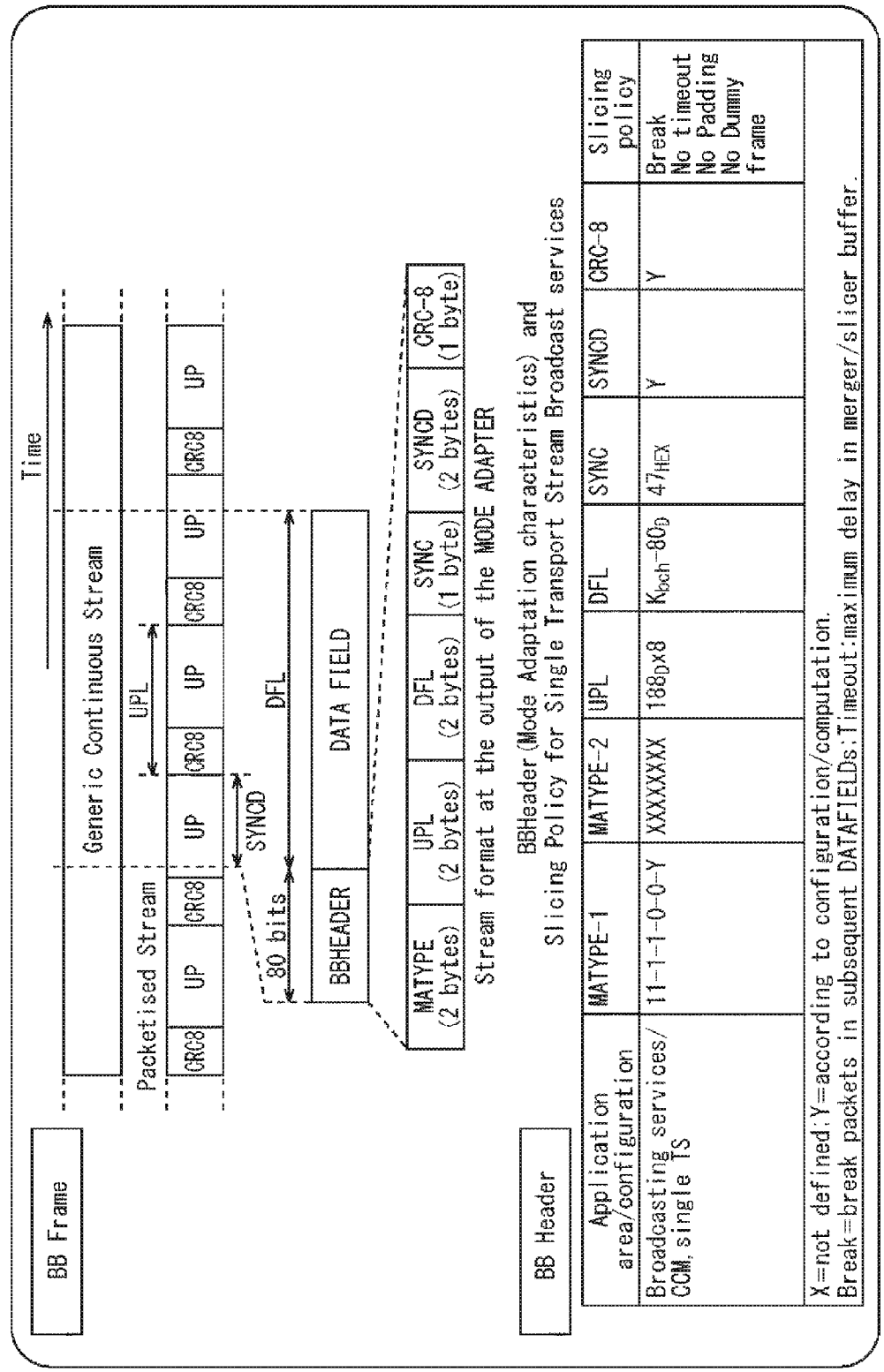
FIG. 16 is an explanatory diagram of a size identifier indicating the size of DNP.

FIG. 16 is an explanatory diagram of a size identifier indicating the size of DNP.

When the NP deletion unit $32_n$ changes the synchronized stream into an NP-deleted stream by deleting the NPs from the synchronized stream, the NP deletion unit $32_n$ adds a one-byte DNP indicating the number of NPs deleted between the packet and the next packet to the top of each packet in the NP-deleted stream.

The one-byte DNP can indicate a number between zero and 255 as the number of NPs deleted between a packet and the next packet.

By the way, when the number N of channels to which the splitter 21 divides an input stream into the divided streams is a large number, the number of NPs sequentially inserted into the divided stream tends to be a large number.

However, when the DNP is a byte, the DNP can indicate the number only up to 255. Thus, the NP deletion unit $32_n$ can delete only up to 255 NPs if more than 255 NPs are sequentially included in the synchronized stream.

In light of the foregoing, a DNP having a size larger than a byte, for example, a two-byte DNP can be used.

A two-byte DNP can indicate a number (from zero) to 65535. This enables the NP deletion unit $32_n$ to delete the number up to 65535 of sequential NPs.

By the way, DNP is added to the top of each packet in an NP-deleted stream. Thus, when the size of the DNP is two bytes, the overhead of the NP-deleted stream is doubled in comparison with the overhead when the size of the DNP is a byte.

When the number N of channels to which the splitter 21 divides an input stream into the divided streams is a small number, the number of NPs sequentially inserted into the divided stream tends to be a small number. Thus, the NP deletion unit $32_n$ sometimes deletes NPs as many as the number indicated with only a one-byte DNP even if a two-byte DNP is used (NPs exceeding the number indicated with the one-byte DNP are sometimes not deleted).

In light of the foregoing, the size of DNP can be selected from one byte and two bytes in the transmission system illustrated in FIG. 1. The FEC unit $33_n$ can generate a stream including the signaling that is a size identifier indicating the size of the DNP and the NP-deleted stream.

The FEC unit $33_n$ generates a BB frame stream by adding a BB header, and necessary in-band signaling to one or more packets in the NP-deleted stream on the channel ch#n provided from the NP deletion unit $32_n$ as described above.

The size identifier can be included, for example, in the BB header of the BB frame.

FIG. 16 illustrates the format of the BB frame.

For example, a field in which fixed values are set in the BB header of the BB frame can be used as the size identifier.

In other words, a field in which fixed values are set in the BB header is, for example, a two-byte UPL or a one-byte SYNC. One or more bits of the UPL or SYNC of the fixed values can be used as the size identifier.

When one byte or two bytes is selectively used as the size of DNP as described above, a bit of the UPL or SYNC of the fixed values is used as the size identifier. For example, when the size of the DNP is one byte, the value of the bit of the UPL or SYNC of the fixed value is used as the size identifier without any change. When the size of the DNP is one byte, the value of the bit of the UPL or SYNC of the fixed values used as the size identifier can be a value obtained by inverting the original values.

Note that not only one byte and two bytes but also three or more bytes can be used as the size of DNP.

When the FEC unit $33_n$ in the transmission device 11 generates a BB frame stream including a size identifier as described above, the NP insertion unit $63_n$ in the reception device 12 recognizes the size of the DNP included in the received post-FEC stream, namely, the NP-deleted stream in the BB frame format in accordance with the size identifier, and inserts NPs an many as the number indicated with the DNP having the size.

Transmission of BUFS and BUFSTAT

FIG. 17 illustrates the format of ISSY.

ISSY includes ISCR, BUFS, and BUFSTAT.

ISCR is the time information indicating the time when the packet is transmitted as described above, and is two or three-byte information.

BUFS is (actually) two-byte information indicating the buffer capacity (required buffer amount) of the buffer $64_n$ required to store the received post-FEC stream when the NP insertion unit $63_n$ restores the synchronized stream as the NP-inserted stream by inserting NPs into the received post-FEC stream.

The fifth and sixth bits from the top of the bit string that is two-byte (First byte and Second byte) BUFS are referred to as BUFS_UNIT. The BUFS_UNIT indicates the unit of the buffer capacity indicated by the BUFS. Ten bits from the seventh bit to the last 16th bit indicate the value of the buffer capacity.

For example, a storage area, which works as the buffer $64_n$ having a buffer capacity indicated by the BUFS, is secured in the NP insertion unit $63_n$ of the reception device 12. The received post-FEC stream is written to the buffer $64_n$ while the synchronized stream is restored as the NP-inserted stream.

BUFSTAT is (actually) two-byte information indicating the reading start time when the packet is read from the buffer $64_n$ while the NP insertion unit $63_n$ restores the synchronized stream as the NP-inserted stream by reading the packets (of the received post-FEC stream) stored in the buffer $64_n$.

Note that the fifth and sixth bits from the top of the bit string that is two-byte (First byte and Second byte) BUF-STAT are referred to as BUFSTAT_UNIT. The BUFS_UNIT indicates the unit of the reading start time indicated by the BUFSTAT. Ten bits from the seventh bit to the last 16th bit indicate the value of the reading start time. The 10 bits of the BUFSTAT indicate the reading start time with the remaining amount of data in the buffer $64_n$ when the packets are read from the buffer $64_n$.

The NP insertion unit $63_n$ in the reception device 12 start reading the packets from the buffer $64_n$ at the timing (time) indicated by the BUFSTAT when the NP insertion unit $63_n$ restores the synchronized stream as the NP-inserted stream.

The ISCR in the ISSY described above is added to each packet of the divided streams in the synchronization unit $31_n$ of the transmission device 11 so that the merging unit 52 in the reception device 12 reconstructs the input stream.

Thus, when only an ISSY can be added to each packet of the divided streams and the ISCR is added to each packet, it may be impossible to add the BUFS and BUFSTAT to each packet.

Thus, the transmission device 11 needs transmitting the signaling that is the BUFS and BUFSTAT in a method different from the method for transmitting the ISCR.

For example, similarly to the size identifier, the BUFS and BUFSTAT can be included in the BB header of the BB frame of which stream is generated by the FEC unit $33_n$.

FIG. 18 is a diagram of the format of the BB header.

For example, UPL or SYNC that is a field in which fixed values are set in the BB header can be used as the BUFS and BUFSTAT, similarly to the size identifier.

In this example, when all of the size identifier, BETS, and BUFSTAT are included in the BB header, for example, the BUFS and BUFSTAT can be included in UPL, and the size identifier can be included in SYNC.

Note that, for example, a one-bit size identifier can be included in a one-byte SYNC in the BB header of each BB frame.

Each of the BUFS and BUFSTAT has two bytes. Thus, the BUFS and BUFSTAT can per periodically (regularly), for example, alternately be included in a two-byte UPL in the BB header of each BB frame.

Another Method for Transmitting the Size Identifier, BUFS, and BUFSTAT

FIG. 19 is an explanatory diagram of another method for transmitting the size identifier, BUFS, and BUFSTAT.

In the words, FIG. 19 is a diagram of the format of the BB frame.

As described above, the in-band signaling can be added to the BB frame.

There are two types of in-band signaling, IN-BAND type A Signaling and IN-BAND type B Signaling in DVB-T2. In place of the types of in-band signaling, new in-band signaling can be used in the transmission system FIG. 1.

As illustrated in FIG. 19, the new in-band signaling includes a one-bit size identifier, a two-bite BUFSTAT_UNIT, a 10-bit BUFSTAT (namely, the value of the transmission start time), a two-bit BUFS_UNIT, and a 10-bit BUFS (namely, the value of the buffer capacity).

The new in-band signaling is added to a BB frame when the FEC unit $33_n$ in the transmission device 11 generates the BB frame.

TS is used as the input stream in the present embodiment. Note that, however, a stream formed by a plurality of packets can be used as the input stream instead of TS.

Description of a Computer Using the Present Invention

The sequence of processes described above can be performed with hardware or software. When the sequence of processes is performed with software, the program of the software is installed, for example, on a general-purpose computer.

Figure 20:
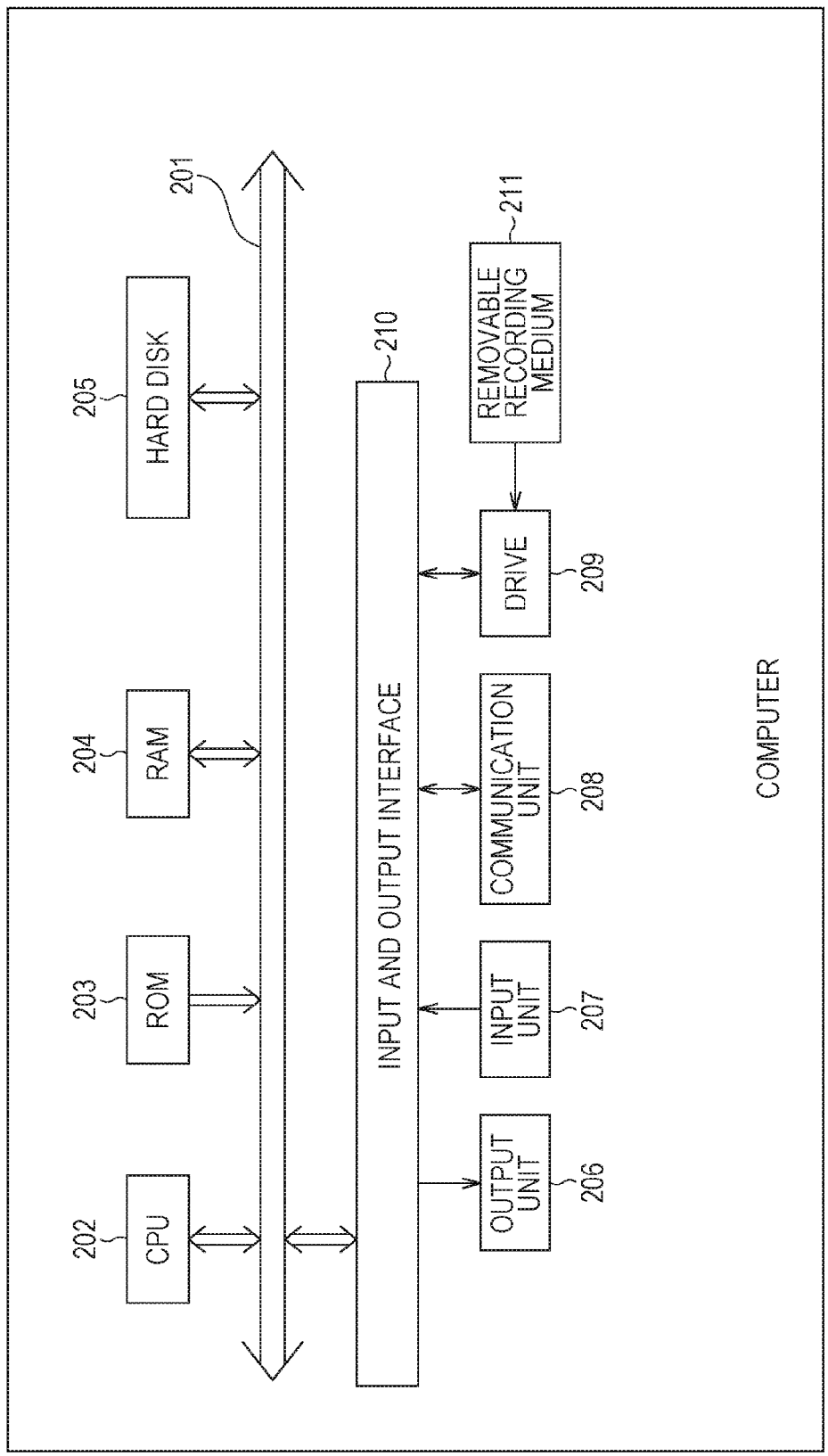
FIG. 20 is a block diagram of an exemplary configuration of an embodiment of a computer using the present invention.

FIG. 20 illustrates an exemplary configuration according to an embodiment of a computer on which the program for performing the sequence of processes is installed.

The program can previously be stored in a hard disk 205 or ROM 203 that is a recoding medium embedded in the computer.

Alternatively, the program can be stored (recorded) in a removable recording medium 111. The removable recording medium 111 can be provided as so-called package software. The removable recording medium 111 is, for example, a flexible disk, a compact disc read only memory (CD-ROM), a magneto optical (MO) disk, a digital versatile disc (DVD), a magnetic disk, or a semiconductor memory.

Note that the program can be downloaded to the computer via a communication network or a broadcast network and installed on the built-in hard disk 205 instead of being installed on the computer from the removable recording medium 111. In other words, the program can be transferred, for example, from a download site via an artificial satellite for digital satellite broadcast to the computer in wireless communication, or via a network such as a local area network (LAN) or the Internet to the computer in wired communication.

The computer includes a central processing unit (CPU) 202. An input and output interface 110 is connected to the CPU 202 via a bus 201.

When the user inputs the instruction via the input and output interface 110 to the CPU 202, for example, by operating an input unit 207, the CPU 202 executes the program stored in the read only memory (ROM) 203 in accordance with the instruction. Alternatively, the CPU 202 executes the program stored in the hard disk 205 by loading the program on the random access memory (RAM) 204.

The CPU 202 performs the process in accordance with the flowchart, or the process performed by the configuration of the block diagram as described above. Then, the CPU 202, for example, outputs the process result from the output unit 206, transmits the process result from the communication unit 208, or records the process result to the hard disk 205 via the input and output interface 110 as necessary.

Note that the input unit 207 includes, for example, a keyboard, a mouse, or a microphone. The output unit 206 includes a liquid crystal display (LCD) or a loudspeaker.

The processes that the computer performs in accordance with the programs in the specification are not necessarily performed in the order illustrated as the flowchart. In other words, the processes that the computer performs in accordance with the programs include processes performed in parallel or individually (for example, parallel processing or processing by the object).

Alternatively, the program can be executed by a computer (processor), or by a plurality of computers in decentralized processing. Alternatively, the program can also be executed after being transferred to a remote computer.

The system is a collection of a plurality of components (for example, devices, or modules (parts)) herein. It does not matter if all of the components are housed in a housing. Thus, each of the devices housed in different housings and connected via a network, and an apparatus in which the modules are housed in a housing is a system.

Note that the embodiments of the present invention are not limited to the embodiment described above, and can variously be changed without departing from the gist of the present technique.

For example, the present invention can be the configuration in the cloud computing in which a function can be shared by a plurality of devices and performed by the cooperation of the devices.

Each step in the flowcharts can b be performed by a device or shared and performed by a plurality of devices.

When a step includes a plurality of processes, the processes in the step can be performed by a device or shared and performed by a plurality of devices.

The effects described herein are merely examples, and the effects of the present invention are not limited to the effects and can include another effect.

REFERENCE SIGNS LIST

11 Transmission device
12 Reception device
13 Transmission channel
21 Splitter
$22_1$ to $22_N$ Buffer
$23_1$ to $23_N$ Channel processing unit
26 Symbol clock generation unit
27 Time-related information generation unit
$31_1$ to $31_N$ Synchronization unit
$32_1$ to $32_N$ NP deletion unit
$33_1$ to $33_N$ FEC unit
$34_1$ to $34_N$ MOD unit
$51_1$ to $51_N$ Channel processing unit
52 Merging unit
$61_1$ to $61_N$ DMD unit
$62_1$ to $62_N$ FEC unit
$63_1$ to $63_N$ NP insertion unit
$64_1$ to $64_N$, 81 Buffer
82 Packet distribution unit
83 Channel selection unit
91 Latch circuit
92, 93 Arithmetic circuit
94 Selector
94 Comparison circuit
111 Channel selection unit
$121_1$ to $121_3$ Counter
$122_1$ to $122_3$ Selection flag output unit
123 Selection control unit 201 Bus
202 CPU
203 ROM
204 RAM
205 Hard disk
206 Output unit
207 Input unit
208 Communication unit
209 Drive
110 Input and output interface
111 Removable recording medium

The invention claimed is:

1. A data processor comprising:
circuitry configured to divide an input stream formed by a plurality of packets into divided streams on a plurality of channels including the packets of the input stream at a constant density by evenly distributing each of the packets of the input stream to a channel of the plurality of channels and distributing null packets (NP) to all of channels other than the channel, the NPs included in the divided streams at rations corresponding to ratios of reciprocals of data rates required in NP-deleted streams; and
a plurality of buffers configured to store the packets of the input stream.

2. The data processor according to claim 1, wherein the NP-deleted streams are obtained by deleting the NPs from the divided streams on the channels.

3. A data processing method comprising:
dividing an input stream formed by a plurality of packets into divided streams on a plurality of channels including the packets of the input stream at a constant density by evenly distributing each of the packets the input stream to a channel of the plurality of channels and distributing null packets (NP) to all of channels other than the channel, the NPs included in the divided streams at rations corresponding to ratios of reciprocals of data rates required in NP-deleted streams.

4. A data processor comprising:
first circuitry configured to divide an input stream formed by a plurality of packets into divided streams on a plurality of channels including the packets of the input stream at a constant density by evenly distributing each of the packets of the input stream to a channel of the plurality of channels and distributing null packets (NP) to all of channels other than the channel and transmit one or more of divided streams, the NPs included in the divided streams at rations corresponding to ratios of reciprocals of data rates required in NP-deleted streams; and
second circuitry configured to process the one or more divided streams transmitted.

5. The data processor according to claim 4, wherein the NP-deleted streams are obtained by deleting the NPs from the divided streams on the channels.

6. A data processing method comprising:
dividing, by circuitry, an input stream formed by a plurality of packets into divided streams on a plurality of channels including the packets of the input stream at a constant density by evenly distributing each of the packets of the input stream to a channel of the plurality of channels and distributing null packets (NP) to all of channels other than the channel, the NPs included in the divided streams at rations corresponding to ratios of reciprocals of data rates required in NP-deleted streams;
transmitting, by the circuitry, one or more of divided streams; and
processing, by another circuitry, the one or more of divided streams transmitted from the circuitry.

* * * * *